US008125670B2

(12) United States Patent
Ueno et al.

(10) Patent No.: US 8,125,670 B2

(45) Date of Patent: Feb. 28, 2012

(54) DATA PROCESSING APPARATUS AND RECORDING MEDIUM

(75) Inventors: Hideo Ueno, Nagoya (JP); Masashi Suzuki, Nagoya (JP); Hiroshi Koie, Nagoya (JP); Kazunari Taki, Nagoya (JP); Takahiro Ikeno, Seto (JP); Takahiro Hosokawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1170 days.

(21) Appl. No.: 11/860,163

(22) Filed: Sep. 24, 2007

(65) Prior Publication Data

US 2008/0189574 A1 Aug. 7, 2008

(30) Foreign Application Priority Data

Sep. 28, 2006 (JP) ................................ 2006-265321

(51) Int. Cl.
*G06F 3/12* (2006.01)

(52) U.S. Cl. ..................................................... 358/1.15

(58) Field of Classification Search ........................ None
See application file for complete search history.

(56) References Cited

U.S. PATENT DOCUMENTS 5,550,964 A 8/1996 Davoust
5,862,270 A 1/1999 Lopresti et al.
5,983,241 A 11/1999 Hoshino
6,233,409 B1 5/2001 Haines et al.
6,409,401 B1 6/2002 Petteruti et al.
6,477,528 B1 11/2002 Takayama
6,486,056 B2 11/2002 Pasch et al.
6,585,154 B1 7/2003 Ostrover et al.
6,691,918 B1 2/2004 Yoda et al.
6,827,279 B2 12/2004 Teraura
6,846,056 B2 1/2005 Jacobsen et al.
7,429,965 B2 9/2005 Weiner
7,003,256 B2 2/2006 Kumakura et al.
7,061,634 B1 6/2006 Ogura et al.
7,405,841 B2 7/2008 Takenouchi
7,428,067 B2 9/2008 Kiwada
7,443,420 B2 10/2008 Maeda
7,450,253 B2 11/2008 Kiwada
7,466,957 B2 12/2008 Muto (Continued)

FOREIGN PATENT DOCUMENTS

CN 1319821 A 10/2001

(Continued)

OTHER PUBLICATIONS

JP Office Action dtd Jul. 14, 2009, JP Appln. 2006-265321, partial English Translation.

(Continued)

*Primary Examiner* — Twyler Haskins
*Assistant Examiner* — Lennin Rodriguez
(74) *Attorney, Agent, or Firm* — Banner & Witcoff, Ltd.

(57) ABSTRACT

A data processing apparatus includes a data reading unit that reads data from a non-contact tag, and a restoration unit that restores a file when the data reading unit reads, from the non-contact tag, (i) location information indicating a storage location where the file is previously stored and (ii) at least one of a flag indicating that the file is to be restored and a restoration program for restoring the file, in accordance with the read at least one of the flag and the restoration program.

22 Claims, 18 Drawing Sheets

U.S. PATENT DOCUMENTS

| | | | | |
|---|---|---|---|---|
| 7,512,878 | B2 | 3/2009 | Shur et al. | |
| 7,532,836 | B2 | 5/2009 | Kawabuchi et al. | |
| 7,604,160 | B2 | 10/2009 | Imine et al. | |
| 7,710,590 | B2 | 5/2010 | de Beus et al. | |
| 7,728,992 | B2 | 6/2010 | Yamamoto et al. | |
| 7,731,435 | B2 | 6/2010 | Piersol et al. | |
| 7,905,403 | B2 | 3/2011 | Nagase | |
| 7,916,031 | B2 | 3/2011 | Kothari et al. | |
| 2002/0049702 | A1 | 4/2002 | Aizikowitz et al. | |
| 2003/0053118 | A1 | 3/2003 | Muramoto | |
| 2003/0088557 | A1 | 5/2003 | Morino | |
| 2003/0223638 | A1 | 12/2003 | Jackson et al. | |
| 2004/0096123 | A1 | 5/2004 | Shih et al. | |
| 2004/0100381 | A1 | 5/2004 | Waters | |
| 2004/0109194 | A1 | 6/2004 | Yano | |
| 2004/0141200 | A1 | 7/2004 | Minami et al. | |
| 2004/0184097 | A1 | 9/2004 | Suzuki | |
| 2005/0003839 | A1* | 1/2005 | Tripp | 455/466 |
| 2005/0024393 | A1 | 2/2005 | Kondo et al. | |
| 2005/0029353 | A1 | 2/2005 | Isemura et al. | |
| 2005/0105724 | A1 | 5/2005 | Hull et al. | |
| 2005/0125093 | A1 | 6/2005 | Kikuchi et al. | |
| 2005/0141003 | A1 | 6/2005 | Yamamoto et al. | |
| 2005/0141004 | A1 | 6/2005 | Kiwada | |
| 2005/0162699 | A1 | 7/2005 | Fukunaga et al. | |
| 2005/0171739 | A1 | 8/2005 | Squibbs et al. | |
| 2005/0172215 | A1 | 8/2005 | Squibbs et al. | |
| 2005/0175259 | A1 | 8/2005 | Takenouchi | |
| 2005/0200910 | A1 | 9/2005 | Kanoshima et al. | |
| 2006/0017950 | A1* | 1/2006 | Ikegami et al. | 358/1.13 |
| 2006/0047999 | A1 | 3/2006 | Passerini et al. | |
| 2006/0051056 | A1 | 3/2006 | Furukawa | |
| 2006/0061814 | A1 | 3/2006 | Tokunaga | |
| 2006/0076399 | A1 | 4/2006 | Imine et al. | |
| 2006/0098236 | A1 | 5/2006 | Yamashita et al. | |
| 2006/0132816 | A1* | 6/2006 | Yamamoto et al. | 358/1.13 |
| 2006/0164696 | A1 | 7/2006 | Kurohata et al. | |
| 2006/0176511 | A1 | 8/2006 | Tagawa | |
| 2006/0248454 | A1 | 11/2006 | Giannetti | |
| 2007/0024901 | A1* | 2/2007 | Kayama | 358/1.15 |
| 2007/0036599 | A1 | 2/2007 | Piersol et al. | |
| 2007/0078559 | A1 | 4/2007 | Rosen | |
| 2007/0146878 | A1 | 6/2007 | Liao | |
| 2007/0152058 | A1 | 7/2007 | Yeakley et al. | |
| 2007/0273525 | A1 | 11/2007 | Garber et al. | |
| 2008/0079994 | A1 | 4/2008 | Ueno et al. | |
| 2008/0098303 | A1 | 4/2008 | Murayama | |
| 2008/0151299 | A1 | 6/2008 | Takahata | |
| 2008/0180710 | A1 | 7/2008 | Muto | |
| 2008/0232882 | A1 | 9/2008 | Koi et al. | |
| 2008/0247794 | A1 | 10/2008 | Muto | |
| 2008/0317479 | A1 | 12/2008 | Kadowaki | |

FOREIGN PATENT DOCUMENTS

| | | | |
|---|---|---|---|
| EP | 0 944 238 | A1 | 9/1999 |
| JP | 62-171049 | A | 7/1987 |
| JP | 62-197840 | A | 9/1987 |
| JP | 63-065544 | A | 3/1988 |
| JP | 2-260045 | A | 10/1990 |
| JP | 3-4937 | B2 | 1/1991 |
| JP | 3-102438 | A | 4/1991 |
| JP | 5-113920 | A | 5/1993 |
| JP | 7-334397 | A | 12/1995 |
| JP | 8-202603 | A | 8/1996 |
| JP | 9-034763 | A | 2/1997 |
| JP | 2624170 | B2 | 4/1997 |
| JP | 10-294818 | A | 11/1998 |
| JP | 2000-020664 | | 1/2000 |
| JP | 3036977 | B2 | 4/2000 |
| JP | 2000-285203 | | 10/2000 |
| JP | 2001-043231 | A | 2/2001 |
| JP | 2001-134723 | | 5/2001 |
| JP | 2001-180021 | A | 7/2001 |
| JP | 2002-149701 | A | 5/2002 |
| JP | 2002-337426 | | 11/2002 |
| JP | 2003-242158 | A | 8/2003 |
| JP | 2003-263084 | A | 9/2003 |
| JP | 2003-320735 | | 11/2003 |
| JP | 2003-330769 | A | 11/2003 |
| JP | 2003-346086 | A | 12/2003 |
| JP | 2004-066692 | | 3/2004 |
| JP | 2004-094731 | A | 3/2004 |
| JP | 2004-094953 | | 3/2004 |
| JP | 2004-157588 | | 6/2004 |
| JP | 2004-181953 | A | 7/2004 |
| JP | 2004-222085 | | 8/2004 |
| JP | 2004-249499 | | 9/2004 |
| JP | 2004-265586 | A | 9/2004 |
| JP | 2004-287556 | | 10/2004 |
| JP | 2004-310293 | | 11/2004 |
| JP | 2004-310293 | A | 11/2004 |
| JP | 2004-314590 | A | 11/2004 |
| JP | 2004-322570 | | 11/2004 |
| JP | 2005-022847 | | 1/2005 |
| JP | 2005-028673 | A | 2/2005 |
| JP | 2005-059577 | | 3/2005 |
| JP | 2005-101935 | | 4/2005 |
| JP | 2005-109681 | | 4/2005 |
| JP | 2005-117571 | | 4/2005 |
| JP | 2005-148240 | | 6/2005 |
| JP | 2005-149291 | A | 6/2005 |
| JP | 2005-151244 | A | 6/2005 |
| JP | 2005-165410 | A | 6/2005 |
| JP | 2005-174530 | | 6/2005 |
| JP | 2005-192080 | | 7/2005 |
| JP | 2005-196263 | | 7/2005 |
| JP | 2005-196840 | A | 7/2005 |
| JP | 2005-197831 | | 7/2005 |
| JP | 2005-197834 | | 7/2005 |
| JP | 2005-197835 | | 7/2005 |
| JP | 2005-202714 | A | 7/2005 |
| JP | 2005-212303 | | 8/2005 |
| JP | 2005-225100 | | 8/2005 |
| JP | 2005-236740 | A | 9/2005 |
| JP | 2005-242763 | | 9/2005 |
| JP | 2005-246680 | A | 9/2005 |
| JP | 2005-280046 | | 10/2005 |
| JP | 2005-285094 | | 10/2005 |
| JP | 2005-303422 | A | 10/2005 |
| JP | 2005-305662 | | 11/2005 |
| JP | 2005-313551 | | 11/2005 |
| JP | 2005-327248 | | 11/2005 |
| JP | 2005-332042 | A | 12/2005 |
| JP | 2006-007674 | | 1/2006 |
| JP | 2006-011977 | | 1/2006 |
| JP | 2006-027678 | | 2/2006 |
| JP | 2006-053671 | A | 2/2006 |
| JP | 2006-054777 | A | 2/2006 |
| JP | 2006-065912 | A | 3/2006 |
| JP | 2006-082490 | A | 3/2006 |
| JP | 2006-82940 | A | 3/2006 |
| JP | 2006-094037 | A | 4/2006 |
| JP | 2006-103284 | A | 4/2006 |
| JP | 2006-157439 | A | 6/2006 |
| JP | 2006-175647 | A | 7/2006 |
| JP | 2006-175813 | A | 7/2006 |
| JP | 2006-181807 | A | 7/2006 |
| JP | 2006-197324 | A | 7/2006 |
| JP | 2006-218773 | A | 8/2006 |
| JP | 2006-229670 | A | 8/2006 |
| JP | 2006-252045 | A | 9/2006 |
| JP | 2005-229266 | | 1/2008 |
| JP | 2008-511084 | T | 4/2008 |
| JP | 2001-077959 | A | 10/2009 |
| WO | 2006/023992 | A2 | 3/2006 |
| WO | 2006-023992 | A2 | 3/2006 |
| WO | 2006-064781 | A1 | 6/2006 |

OTHER PUBLICATIONS

Co-Pending U.S. Appl. No. 11/853,386, filed Sep. 11, 2007.
Co-Pending U.S. Appl. No. 11/860,259, filed Sep. 24, 2007.
Co-Pending U.S. Appl. No. 11/858,456, filed Sep. 20, 2007.
Co-Pending U.S. Appl. No. 11/857,803, filed Sep. 19, 2007.
Co-Pending U.S. Appl. No. 11/859,011, filed Sep. 21, 2007.
Co-Pending U.S. Appl. No. 11/861,617, filed Sep. 26, 2007.

Co-Pending U.S. Appl. No. 11/859,481, filed Sep. 21, 2007.
Co-Pending U.S. Appl. No. 11/860,067, filed Sep. 24, 2007.
Co-Pending U.S. Appl. No. 11/862,246, filed Sep. 27, 2007.
JP Office Action dtd Oct. 28, 2008, JP Appln. 2006-265321 (partial translation provided).
JP Office Action dtd Oct. 21, 2008, JP Appln. 2006-262750.
JP Office Action dtd Oct. 14, 2008, JP Appln. 2006-252991.
JP Office Action dtd Oct. 14, 2008, JP Appln. 2006-252990 (partial translation provided).
JP Office Action dtd Oct. 21, 2008, JP Appln. 2006-265322 (partial translation provided).
JP Office Action dtd Aug. 26, 2008, JP Appln. 2006-259117.
JP Office Action dtd Aug. 5, 2008, JP Appln. 2006-257295.
Non-Final Office Action dated Mar. 7, 2011 in U.S. Appl. No. 11/857,803.
Non-Final Office Action dated Mar. 2, 2011 in U.S. Appl. No. 11/858,456.
Non-Final Office Action dated Feb. 18, 2011 in U.S. Appl. No. 11/862,246.
JP Office Action dtd Jan. 20, 2009, JP Appln. 2006-259138.
Non-Final Office Action dated Mar. 21, 2011 in U.S. Appl. No. 11/861,617.
Non-Final Office Action dated Mar. 22, 2011 in U.S. Appl. No. 11/859,481.
Non-Final Office Action dated Apr. 5, 2011 in U.S. Appl. No. 11/860,067.
EP Search Report dtd Mar. 10, 2008, EP App 07253797-0.
CN Office Action dtd May 8, 2009, CN Appln. 200710154195.5, partial English translation.
CN Office Action dtd May 22, 2009, CN Appln. 2007101525327, English translation.
Extended EP Search Report dtd Jul. 2, 2009, EP Appln. 07253683.2.
JP Office Action dtd May 20, 2008, JP Appln. 2006-265320.
JP Office Action dtd May 27, 2008, JP Appln. 2006-259138 (no English translation provided).
Technical Soft Inc.; http://www.softnet.com.jp/kaiteki/index.html; May 23, 2007.
Kinokuniya BookWeb; May 23, 2007.
Notification of Reasons for Refusal dispatched Aug. 17, 2010 in Japanese Application No. 2008-188246 and English Translation thereof.
Non-Final Office Action dated Nov. 10, 2010 in U.S. Appl. No. 11/860,067.
Non-Final Office Action dated Jun. 22, 2011 in U.S. Appl. No. 11/859,011.
Notice of Allowance dated Jul. 8, 2011 in U.S. Appl. No. 11/853,386.
Notice of Allowance dated Sep. 1, 2011 in U.S. Appl. No. 11/860,067.
Final Office Action dated Sep. 2, 2011 in U.S. Appl. No. 11/861,617.
Final Office Action dated Aug. 3, 2011 in U.S. Appl. No. 11/862,246.
Final Office Action dated Aug. 12, 2011 in U.S. Appl. No. 11/857,803.
Final Office Action dated Aug. 17, 2011 in U.S. Appl. No. 11/858,456.
Final Office Action dated Aug. 30, 2011 in U.S. Appl. No. 11/859,481.
Non-Final Office Action dated Dec. 14, 2011 in U.S. Appl. No. 11/860,259.
Final Office Action dated Dec. 1, 2011 in U.S. Appl. No. 11/859,011.
Notice of Allowance dated Dec. 27, 2011 in U.S. Appl. No. 11/861,617.
Final Office Action dated Dec. 27, 2011 in U.S. Appl. No. 11/862,246.

* cited by examiner

FIG. 9

FIRST SHEET

■ FILE DATA SAVE
▲ FILE LOCATION SAVE
▬ DATA WRITTEN TO TAG
▭ DATA NOT WRITTEN TO TAG

| | | | |
|---|---|---|---|
| ▬ | A:¥B1¥C1 | C1 FILE 1 | ■ |
| ▬ | A:¥B1¥C1 | C1 FILE 2 | ▲ |
| ▬ | A:¥B1¥C1 | C1 FILE 3 | ■ |
| ▬ | A:¥B1¥C1¥D1 | D1 FILE 1 | ■ |
| ▬ | A:¥B1¥C1¥D1 | D1 FILE 3 | ▲ |
| ▬ | A:¥B1¥C1¥D1¥E1 | E1 FILE 1 | ■ |
| ▭ | A:¥B1¥C2 | C2 FILE 2 | ■ |
| ▭ | A:¥B1¥C2 | C2 FILE 5 | ▲ |
| ▭ | A:¥B2 | B2 FILE 2 | ■ |
| ▭ | X:¥B1¥C1¥D1 | D1 FILE 2 | ■ |
| ▭ | X:¥B1¥C1¥D1 | D1 FILE 3 | ▲ |
| ▭ | X:¥B1¥C2 | C2 FILE 2 | ▲ |
| ▭ | X:¥B1¥C2 | C2 FILE 3 | ■ |
| ▭ | X:¥B3 | B3 FILE 1 | ▲ |
| ▭ | X:¥B3 | B3 FILE 2 | ■ |

SECOND SHEET

■ FILE DATA SAVE
▲ FILE LOCATION SAVE
▬ DATA WRITTEN TO TAG
▭ DATA NOT WRITTEN TO TAG

| | | | |
|---|---|---|---|
| ▭ | A:¥B1¥C1 | C1 FILE 1 | ■ |
| ▭ | A:¥B1¥C1 | C1 FILE 2 | ▲ |
| ▭ | A:¥B1¥C1 | C1 FILE 3 | ■ |
| ▭ | A:¥B1¥C1¥D1 | D1 FILE 1 | ■ |
| ▭ | A:¥B1¥C1¥D1 | D1 FILE 3 | ▲ |
| ▭ | A:¥B1¥C1¥D1¥E1 | E1 FILE 1 | ■ |
| ▬ | A:¥B1¥C2 | C2 FILE 2 | ■ |
| ▬ | A:¥B1¥C2 | C2 FILE 5 | ▲ |
| ▬ | A:¥B2 | B2 FILE 2 | ■ |
| ▬ | X:¥B1¥C1¥D1 | D1 FILE 2 | ■ |
| ▬ | X:¥B1¥C1¥D1 | D1 FILE 3 | ▲ |
| ▬ | X:¥B1¥C2 | C2 FILE 2 | ▲ |
| ▬ | X:¥B1¥C2 | C2 FILE 3 | ■ |
| ▬ | X:¥B3 | B3 FILE 1 | ▲ |
| ▬ | X:¥B3 | B3 FILE 2 | ■ |

DATA PROCESSING APPARATUS AND RECORDING MEDIUM

CROSS-REFERENCE TO RELATED APPLICATION

This application claims priority from Japanese Patent Application No. 2006-265321, filed on Sep. 28, 2006, the entire subject matter of which is incorporated herein by reference.

TECHNICAL FIELD

Aspects of the present invention relate to a data processing apparatus for reading or recording data on a non-contact tag, and relate to a recording medium equipped with a non-contact tag available for the data processing apparatus.

BACKGROUND

A non-contact tag such as a Radio Frequency Identification tag (RFID tag) is attached to (or embedded in) a recording medium such as sheet. An image is formed on such recording medium and at the same time, data is recorded on the non-contact tag. For example, JP-A-2002-3337426 describes to record software digital data on a non-contact tag and form an image indicating a manual of the software on a recording medium.

SUMMARY

Generally, software is composed of a plurality of data (files), so that corruption of any one of them would cause a failure in the operation thereof. However, there is no way of finding out a storage location at which such corrupted data recorded on a non-contact tag is previously recorded in data source. Therefore, it is difficult to restore the corrupted data. On the other hand, even data other than software, a user may desire to check a storage location at which the data is stored in the data source in order to restore the data.

Aspects of the present invention relate to the above problem. According to at least one aspect of the invention, a image processing apparatus may be provided that reads or records data on a non-contact tag and facilitate restoration of data with at least location information stored on the non-contact tag.

According to an aspect of the invention, data processing apparatus includes a data reading unit that reads data from a non-contact tag, and a restoration unit that restores a file when the data reading unit reads, from the non-contact tag, (i) location information indicating a storage location where the file is previously stored and (ii) at least one of a flag indicating that the file is to be restored and a restoration program for restoring the file, in accordance with the read at least one of the flag and the restoration program.

BRIEF DESCRIPTION OF THE DRAWINGS

In the accompanying drawings:

FIG. 9 is an explanatory view showing another example of the print image with highlighting;

DETAILED DESCRIPTION

Overall Configuration of the Embodiment

Figure 1:
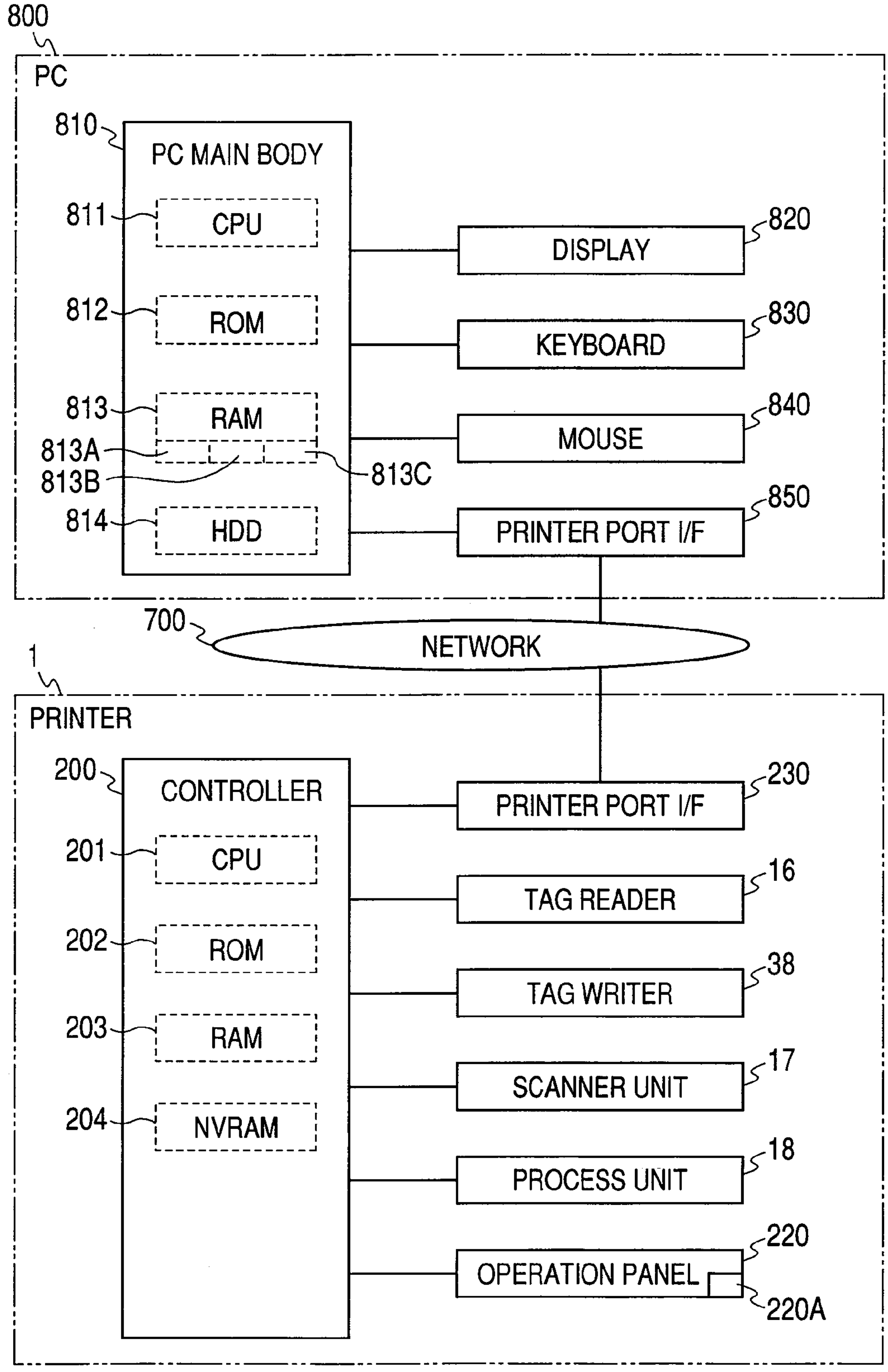
FIG. 1 is a block diagram showing the configuration of a data processing apparatus according to an embodiment of the present invention.

Next, embodiments of the present invention will be described below with reference to the accompanying drawings. FIG. 1 is a block diagram showing the configuration of a data processing apparatus according to an embodiment of the present invention. As shown in FIG. 1, the data processing apparatus of this embodiment includes a printer 1 serving as a terminal and a personal computer (herein after simply referred to as PC□ 800 serving as a host connected to the printer 1 via a network 700. Note that the network 700 may be any network such as an intranet LAN or the Internet.

[Description of the configuration of the printer 1]

Figure 2:
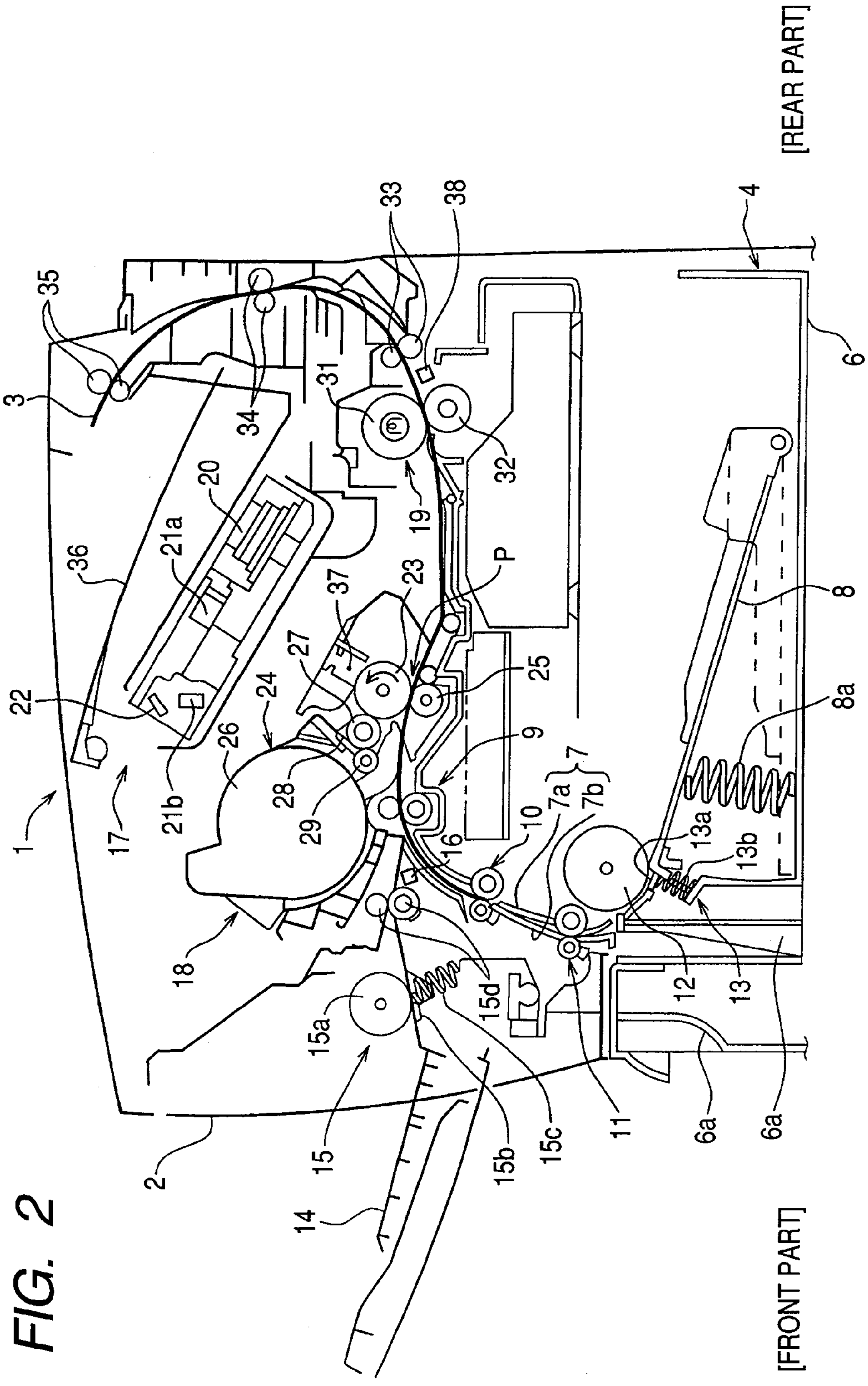
FIG. 2 is a schematic cross-sectional view showing the internal configuration of a printer included in the data processing apparatus.

FIG. 2 is a schematic cross-sectional view showing the internal configuration of the printer 1. As shown in FIG. 2, within a main body case 2, the printer 1 includes a feeder part 4 for feeding sheet 3 serving as a recording medium; a multi-purpose tray 14; a process unit 18 as an example of an image forming unit for forming an image on the fed sheet 3; and a fixing unit 19. Note that in the printer 1, the side on which the multi-purpose tray 14 is mounted in the main body case 2 (the left side in FIG. 2) is herein after referred to as the "front part," while the side opposite on which the multi-purpose tray 14 is mounted in the main body case 2 is referred to as the "rear part."

[Description of the Configuration of the Feeder Part 4]

As shown in FIG. 2, in the bottom part of the main body case 2, the feeder part 4 includes a detachable sheet feed tray 6, a sheet retainer plate 8 provided in the sheet feed tray 6, a feed roller 12 provided above an end of the sheet feed tray 6, and a separation pad 13. In addition, there is provided a curved feed path 7 from the feed roller 12 to an image forming position P (or a contact part between a photosensitive drum 23 and a transfer roller 25, i.e., a transfer position at which a toner image on the photosensitive drum 23 is transferred onto the sheet 3).

The sheet retainer plate 8, which can retain the sheets 3 stacked in layers, is pivotably supported at the distal end part relative to the feed roller 12, thereby the proximal end part is allowed to move up and down. The sheet retainer plate 8 is upwardly energized by a spring 8*a* on its back. The separation pad 13 is disposed to oppose the feed roller 12, so that a pad 13*a* composed of a member having a high friction coefficient is pushed against the feed roller 12 by a spring 13*b*.

On the other hand, the feed path 7 is formed in a curved shape by a pair of guide plates 7*a* and 7*b* for guiding the sheet 3. In addition, there are disposed at appropriate intervals on the feed path 7 sequentially from the upstream of the sheet feed direction, the feed roller 12; a pair of feed rollers 11 including a pair of a drive roller and a follower roller; a pair of feed rollers 10 including a pair of a drive roller and a follower roller; and a pair of registration rollers 9 including a pair of a drive roller and a follower roller disposed immediately before the image forming position P.

In the feeder part 4 configured as described above, the topmost sheet 3 of those stacked in layers on the sheet retainer plate 8 is pushed against the feed roller 12, and sandwiched between the feed roller 12 and the separation pad 13 by the feed roller 12 being rotated, thereby sheets are fed one by one. The thus fed sheet 3 is also fed by the feed rollers 11, and then sequentially by the feed rollers 10 and the registration rollers 9 to the image forming position P with a predetermined timing.

[Description of the Configuration of the Multi-Purpose Tray 14]

On the front part side of the main body case 2 above the feeder part 4, there are disposed the multi-purpose tray 14 which serves to supply the sheets 3 manually or automatically and a multi-purpose side sheet feed mechanism 15 for feeding the sheets 3 stacked in layers on the multi-purpose tray 14. The multi-purpose side sheet feed mechanism 15 includes a feed roller for the multi-purpose tray 15*a* and a multi-purpose side sheet feed pad 15*b*, and allows the multi-purpose side sheet feed pad 15*b* to be pushed against the feed roller for the multi-purpose tray 15*a* by a spring 15*c* disposed on the back of the multi-purpose side sheet feed pad 15*b*. In addition, the multi-purpose side sheet feed mechanism 15 includes a pair of feed rollers 15*d* including a pair of drive roller and a follower roller.

In the multi-purpose tray 14 configured as described above, the sheets 3 stacked in layers on the multi-purpose tray 14 are sandwiched between the feed roller for the multi-purpose tray 15*a* being rotated and the multi-purpose side sheet feed pad 15*b*, and then fed one by one to the registration rollers 9 via a pair of feed rollers 15*d*.

Figure 3:
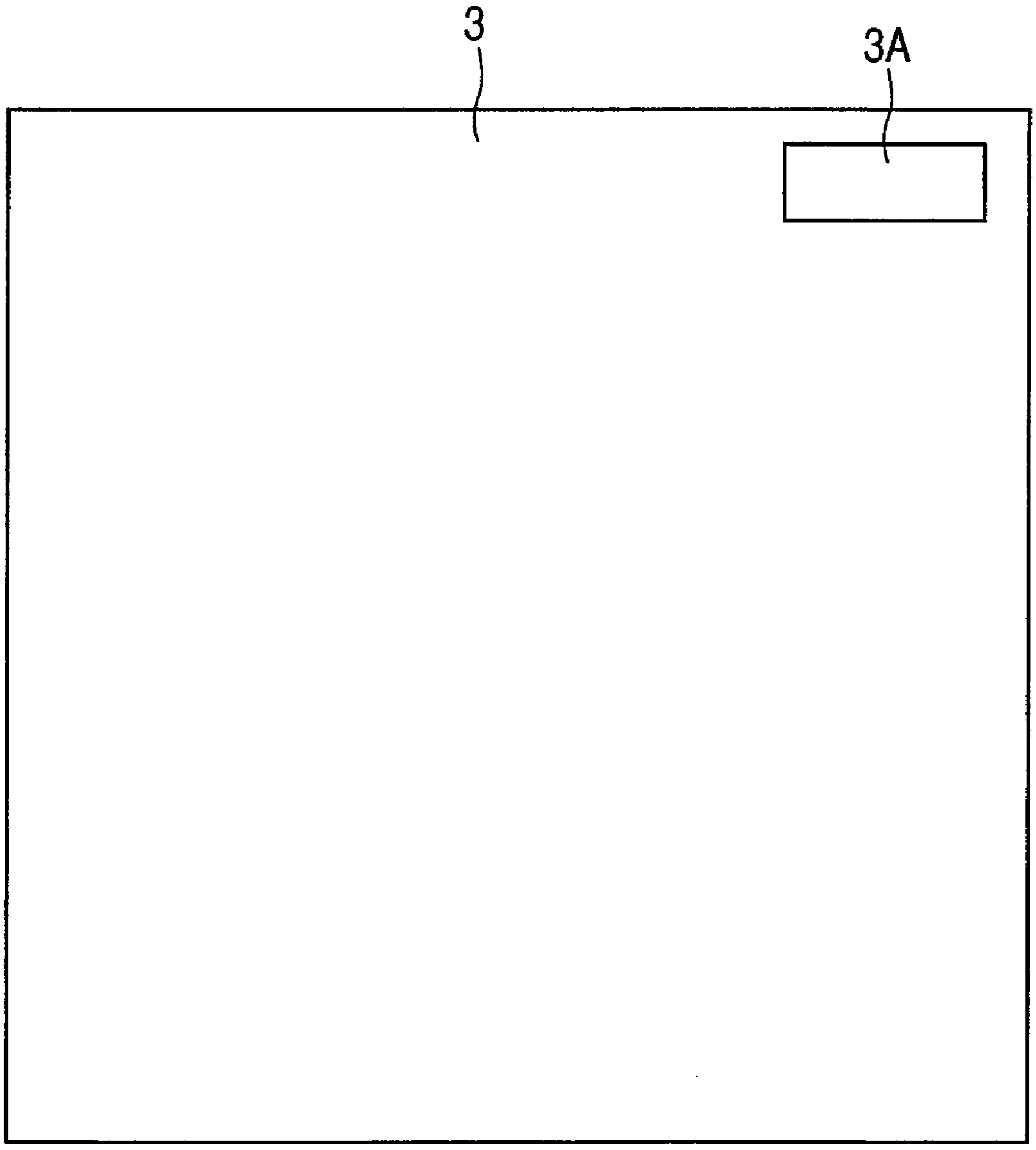
FIG. 3 is an explanatory view showing an example of the configuration of a sheet attached to a non-contact tag.

There is also disposed a tag reader 16 serving as data reading unit between the feed rollers 15*d*, 10 and the registration rollers 9. When the sheet 3 as shown in FIG. 3 having a Radio Frequency Identification Tag (RFID tag: herein after simply referred to as the tag) 3A as an example of a non-contact tag is used, the tag reader 16 reads data recorded on the tag 3A. Consequently, while the sheet 3 equipped with the tag 3A is transported from the sheet feed tray 6 or the multi-purpose tray 14 to the image forming position P, the tag reader 16 can read data from the tag 3A attached to the sheet 3. Note that when data is read from (read out from) the tag 3A attached to the sheet 3 held in the multi-purpose tray 14, it is not always necessary to read (read out) the data while the sheet 3 is being fed. For example, with the sheet 3 being held (placed) in the multi-purpose tray 14, the data may be read (read out) from the tag 3A attached to the sheet 3.

[Description of the Configuration of a Scanner Unit 17]

The scanner unit 17 is disposed under a sheet discharging tray 36 in the upper part of the main body case 2, and includes a laser emitting part (not shown), a rotatably driven polygon mirror 20, lenses 21*a* and 21*b*, and a reflection mirror 22. The laser emitting part emits a laser beam and the laser beam is passing through or reflected from the polygon mirror 20, the lens 21*a*, the reflection mirror 22, and the lens 21*b* so that the scanner unit 17 allows a laser beam to illuminate and quickly scan across the surface of the photosensitive drum 23 of the process unit 18.

[Description of the Configuration of the Process Unit 18]

The process unit 18 includes the photosensitive drum 23 serving as an electrostatic latent image carrier, a scorotron type electrifier 37, a drum cartridge having the transfer roller 25 or the like, and a developing cartridge 24 detachably attached to the drum cartridge. The developing cartridge 24 includes a toner accommodating part 26, a developing roller 27, a layer thickness restricting blade 28, and a toner supply roller 29.

The toner accommodating part 26 is filled with positively charged non-magnetic one-composition polymeric toner as a developer. The toner is supplied by the toner supply roller 29 to the developing roller 27, at the time of which the toner is positively charged by friction between the toner supply roller 29 and the developing roller 27. Furthermore, the toner supplied onto the developing roller 27 is carried on the developing roller 27 in a thin layer of a uniform thickness by the layer thickness restricting blade 28 as the developing roller 27 rotates. On the other hand, the rotating photosensitive drum 23 is disposed opposite the developing roller 27, with the drum body being grounded and its surface being formed of a positively charged organic photosensitive material.

The scorotron type electrifier 37 is disposed above the photosensitive drum 23 with a predetermined gap there between so as not to be in contact with the photosensitive drum 23. The scorotron type electrifier 37 is a positively charging scorotron type electrifier which generates corona discharge from an electrifying wire such as of tungsten, and is designed to positively electrify the surface of the photosensitive drum 23 uniformly.

Then, as the photosensitive drum 23 rotates, the surface of the photosensitive drum 23 is first uniformly and positively charged by the scorotron type electrifier 37, and thereafter exposed to the laser beam from the scanner unit 17 during a quick scan, thereby an electrostatic latent image is formed based on the image data.

Subsequently, as the developing roller 27 rotates, the positively charged toner carried on the developing roller 27 is brought into contact with the photosensitive drum 23. At this time, the toner is supplied onto the electrostatic latent image formed on the surface of the photosensitive drum 23, i.e., onto the exposed part having a reduced potential due to the exposure to the laser beam on the uniformly and positively charged surface of the photosensitive drum 23. Thus, the toner is selectively carried to visualize the image, thereby a toner image is formed.

The transfer roller 25 is disposed below the photosensitive drum 23 to oppose the photosensitive drum 23, and supported rotatably in the clockwise direction in FIG. 2 in the drum cartridge. The transfer roller 25 is configured such that a metal roller shaft is coated with a roller formed of an ionic conductive rubber material, and receives a transfer bias (forward transfer bias) applied thereto from a transfer bias application power supply during transfer. Consequently, the toner image carried on the surface of the photosensitive drum 23 is transferred onto the sheet 3 at the above-described image forming position P while the sheet 3 is passing through between the photosensitive drum 23 and the transfer roller 25.

[Description of the Configuration of the Fixing Unit 19]

As shown in FIG. 2, the fixing unit 19 is disposed to the right of the process unit 18 downstream of the feed direction, and includes one heating roller 31, a pressure roller 32 disposed to push against the heating roller 31, and a pair of feed rollers 33 provided downstream of them. The heating roller 31, which is formed of a metal such as aluminum and includes a heater such as a halogen lamp for heating, allows the toner transferred to the sheet 3 in the process unit 18 to be thermally fixed while the sheet 3 passes through between the heating roller 31 and the pressure roller 32. Thereafter, the sheet 3 is fed by the feed rollers 33 into the discharging path in the rear side part of the main body case 2, and then further fed by feed rollers 34 and discharge rollers 35. Subsequently, the sheet 3 is discharged onto the sheet discharging tray 36.

Furthermore, there is provided a tag writer 38, as an example of data recording unit capable of recording data on the above-described tag 3A, on the sheet feed path between the heating roller 31, the pressure roller 32, and the feed rollers 33. Consequently, when the sheet 3 equipped with the tag 3A is used, desired data can be recorded on the tag 3A of the sheet 3 after an image has been formed thereon.

[Description of the Control System of the Printer 1]

In addition, on the upper surface of the printer 1, there are provided various types of buttons (not shown) such as a tag reading button 220A or an operation panel 220 (see FIG. 1) with a liquid crystal display. Referring back to FIG. 1, the operation panel 220 is connected to a controller 200 in conjunction with the process unit 18, the scanner unit 17, the tag writer 38, and the tag reader 16. The controller 200 is configured as a microcomputer including a CPU 201, a ROM 202, a RAM 203, and a NVRAM 204 in which stored contents will not be erased even when the power supply switch is turned OFF. In addition, the controller 200 is connected to the PC 800 via a printer port interface (printer port I/F) 230 and the network 700.

A PC main body 810 of the PC 800 includes a CPU 811, a ROM 812, a RAM 813, and a hard disk drive (HDD) 814. In addition, the RAM 813 includes a tag writing data area 813A, a print data area 813B, and a restoration area 813C, to be described later. The PC main body 810 is connected to a display 820 such as a CRT, a keyboard 830, a mouse 840, a printer port interface (printer port I/F) 850 for connecting to the controller 200 of the printer 1, and the like.

[Process in the Control System (File Save Process In the PC 800)]

Figure 4:
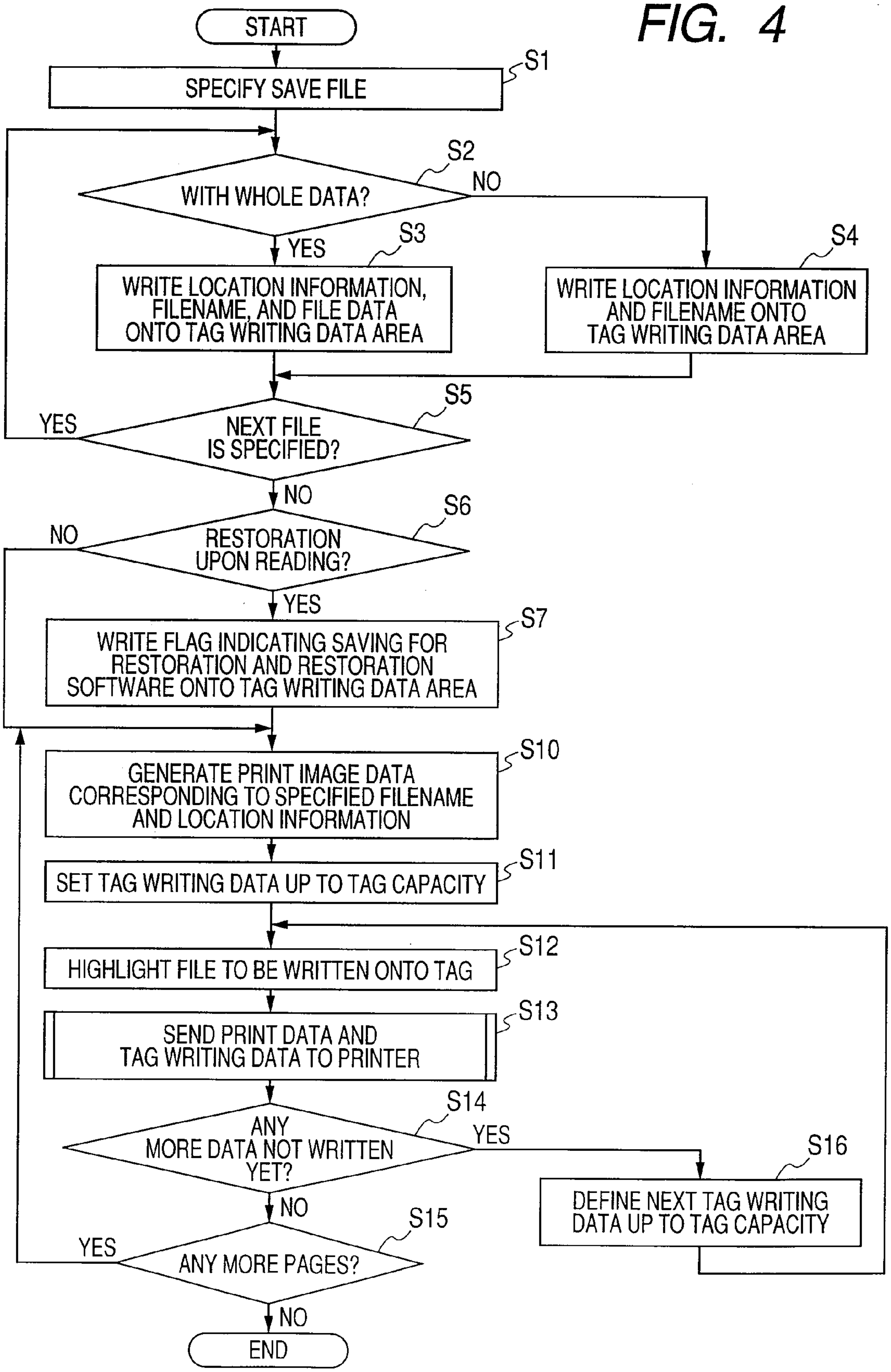
FIG. 4 is a flowchart showing a file save process to be executed in a personal computer that is included in the data processing apparatus.

Now, description will be made to the process in the control system. FIG. 4 is a flowchart showing the file save process to be executed in the PC 800. Note that this process is started by the CPU 811 executing a predetermined program stored in the HDD 814 when an instruction to perform this process is issued on the PC 800.

Figure 5:
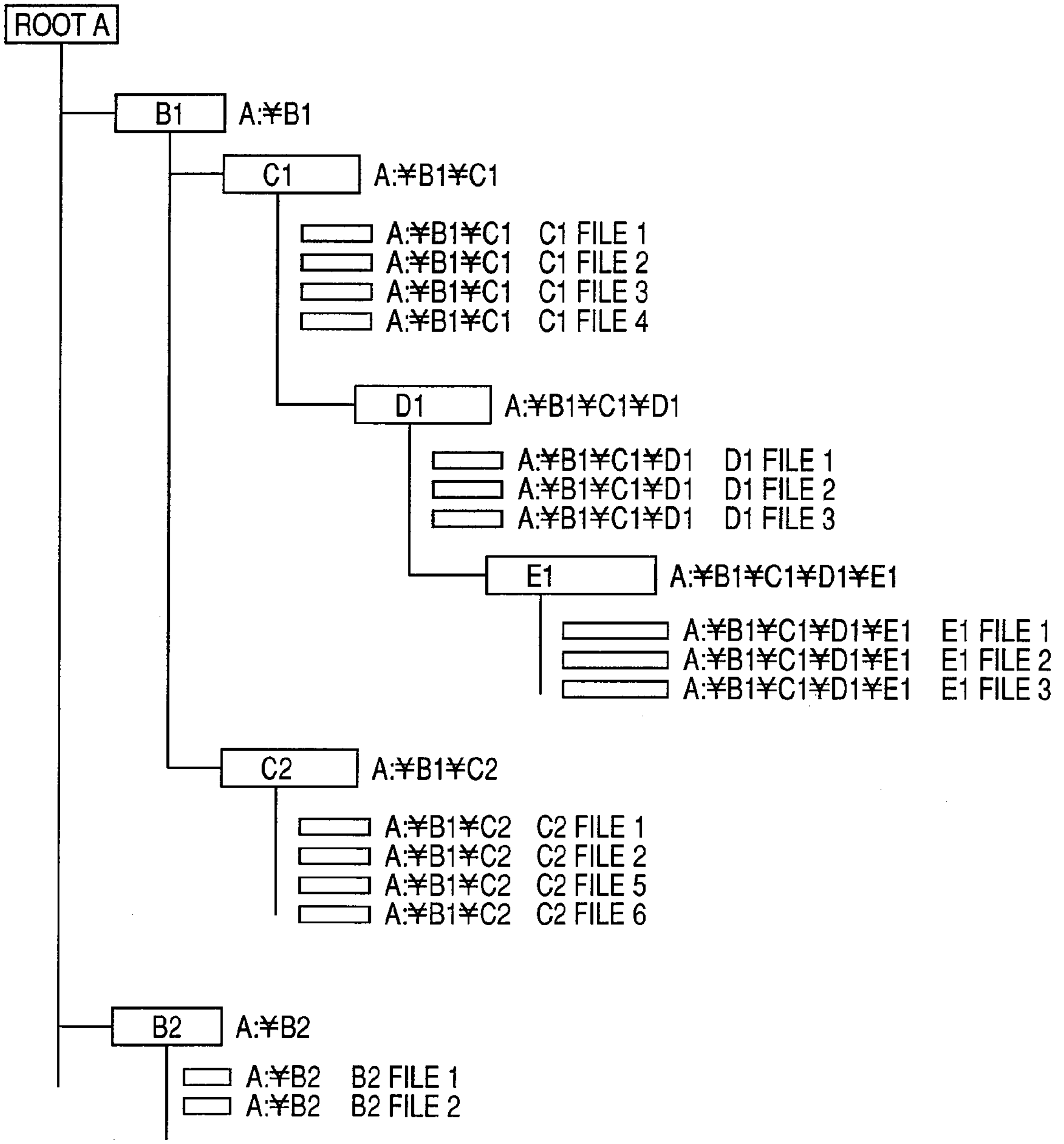
FIG. 5 is an explanatory view showing an example of a file structure image that is displayed in the file save process.
Figure 6:
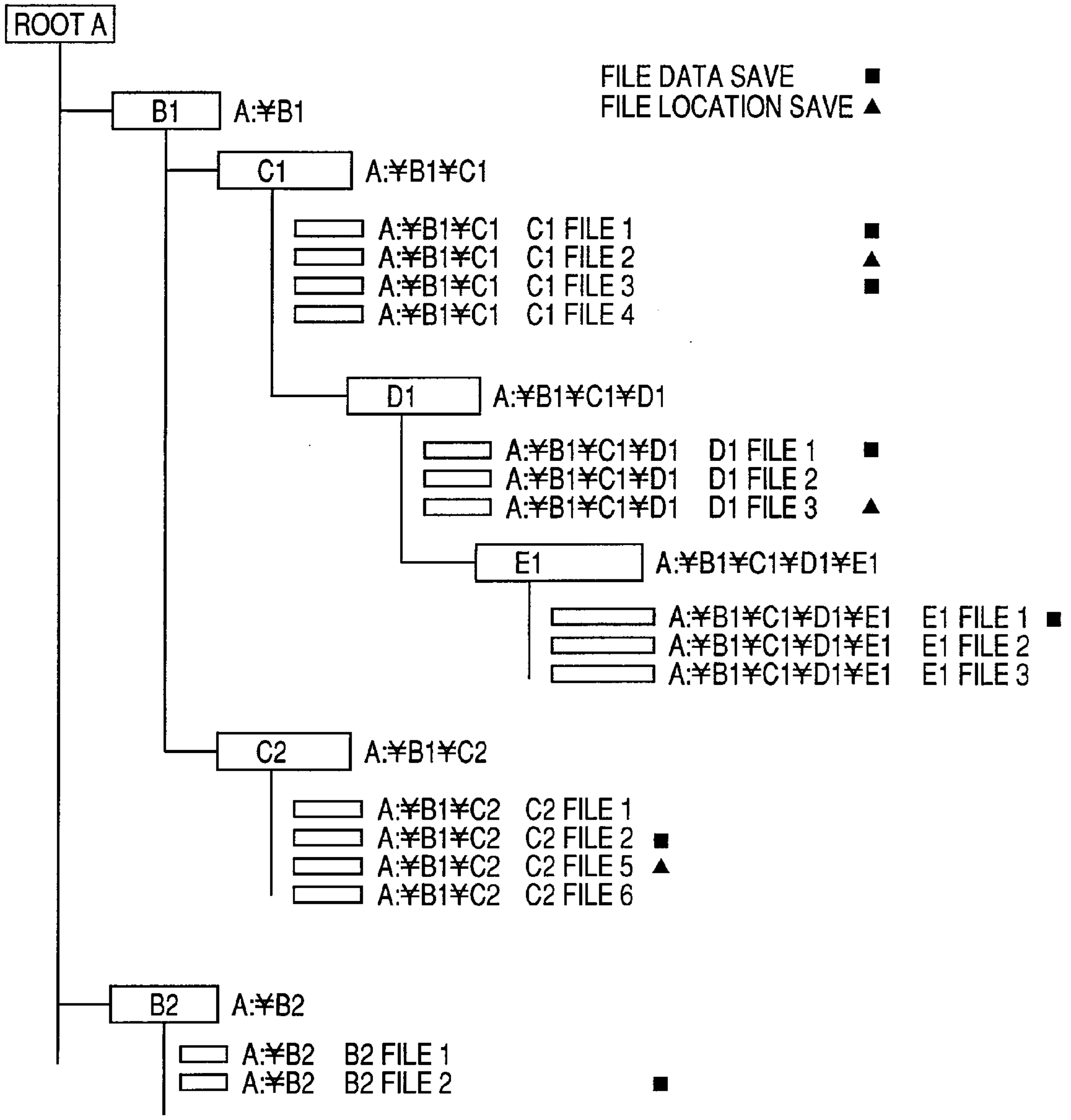
FIG. 6 is an explanatory view showing an example of the file structure image with highlighting.

As shown in FIG. 4, when the process is started, first in S1 (herein after S stands for step), an image of a file structure at a particular location within the HDD 814 is generated and then displayed on the display 820 so that a user can specify a save file. For example, as shown in FIG. 5, the diagram of a tree structure showing Root to the end files is displayed on the display 820. The user can specify a file data save for saving the whole file data in the tag 3A or a file location save for saving, in the tag 3A, only location information containing a filename such as "A:¥B¥C1" of the file data with a mouse 840 or the like. The location information indicates a storage location where a file is originally (previously) stored when the file is saved to the tag 3A. For example, as shown in FIG. 6, once specified, a black square mark and a black triangular mark are displayed on the display 820 for a file specified for the file data save and a file specified for the file location save, respectively.

In S2 subsequent to S1, it is sequentially determined file by file whether the specified file is specified for the file data save or the file location save. If it is determined that filed at a save is specified (S2: Y), then in S3, the location information, filename, and file data itself of the file are written as tag writing data onto the tag writing data area 813A, and then the process proceeds to S5. On the other hand, if it is determined that the file location save is specified (S2: N), then in S4, the location information and filename of the file are written as tag writing data onto the tag writing data area 813A, and then the process proceeds to S5. In S5, it is determined whether any other file has been specified. If any other file has been specified (S5: Y), then the process proceeds to S2 described above; if no other file has been specified (S5: N), the process proceeds to subsequent S6, respectively.

In S6, it is determined whether a restoration upon reading is specified to automatically restore data when data is read from the tag 3A. If the restoration upon reading has been specified (S6: Y), then in S7, a flag indicating that the file is saved for restoration and a file system restoration application software (herein after referred to as the restoration software or the restoration program) are written as tag writing data onto the tag writing data area 813A. If no restoration upon reading has been specified (S6:N), then the process proceeds to S10.

Figure 7:
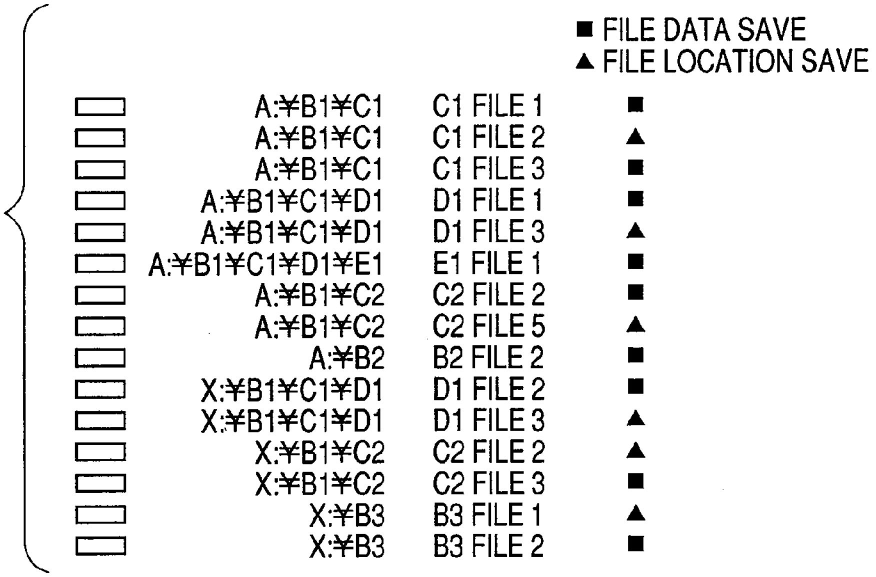
FIG. 7 is an explanatory view showing an example of a print image prepared in the file save process.

In S10, print image data (herein after simply referred to as print data) corresponding to the file name specified in S3 or S4 and location information is generated and then written onto the print data area 813B. For example, when the file data save and the file location save have been specified as shown in FIG. 6, the print data which corresponds to an image as shown in FIG. 7 is generated and then written onto the print data area 813B. The image is obtained by removing location information or the like from the files specified as shown in FIG. 6. When the print data may correspond to a plurality of pages of the sheet 3, the print data is generated in S10 page by page.

In S11, tag writing data corresponding to the print page is set up to the storage capacity of the tag 3A. Note that the above-described flag and restoration software may be determined as data for the first page. On the other hand, the storage capacity of the tag 3A may be acquired via the tag reader 16 by the sheet 3 being fed immediately before the registration rollers 9. Alternatively, when the storage capacity of the tag 3A is standardized with its value stored in a predetermined area such as the HDD 814, the value may be read.

Figure 8:
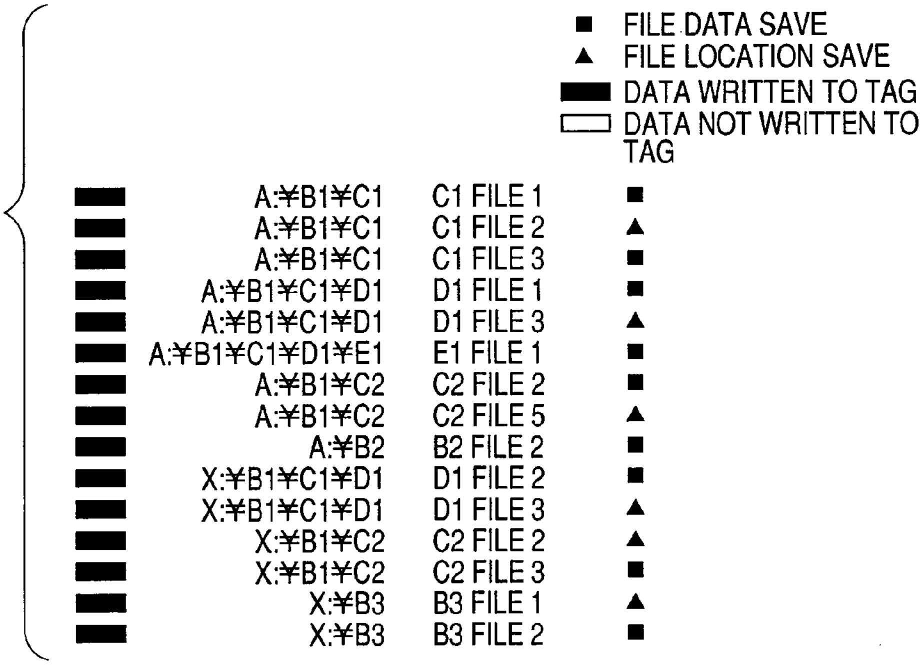
FIG. 8 is an explanatory view showing an example of the print image with highlighting.

In S12, of the print data, the file to be written onto the tag is highlighted, and the data in the print data area 813B is consequently updated. For example, as shown in FIG. 8, when all data corresponding to the page are written on one tag 3A, the rectangular frame indicating a file corresponding to each data is filled in with a predetermined color. Note that other various methods of highlighting can be optionally selected such as attaching a star mark to the right end of a filename in FIG. 7.

When data corresponding to the page is written onto, e.g., two tags 3A, the process of S12 is repeated twice by the process described below, so that as shown in FIG. 9, only the data written on the respective tag 3A attached to the sheet 3 of each page is highlighted.

In S13, the data set in S11 of the tag writing data written on the tag writing data area 813A, and the print data written on the print data area 813B and updated as required is sent to the printer 1. Then, the process proceeds to S14.

In S14, it is determined whether or not a data not written in the same page yet is present, which has not been able to be written onto the tag 3A within its storage capacity in S11. If the data not written yet is not present (S14: N), then in S15, it is determined whether print data of the next page is present. If no print data of the next page is present (S15: N), the process ends. If print data of the next page is present (S15: Y), then the process proceeds to S10 described above to generate print data of the next page.

On the other hand, if data not written in the same page yet is present (S14: Y), the process proceeds to S16, where as in S11, the remaining tag writing data corresponding to the page is set up to the storage capacity of the tag 3A. Then, the process proceeds to S12 described above. In this case, in S12, newly set data is highlighted as described above, and the previous highlighting set through the process of S12 is released. Then, if all the tag writing data corresponding to the page has completely been set (S16, S11) and sent to the printer (S13)(S14:Y), the process proceeds to S15 described above.

Figure 10:
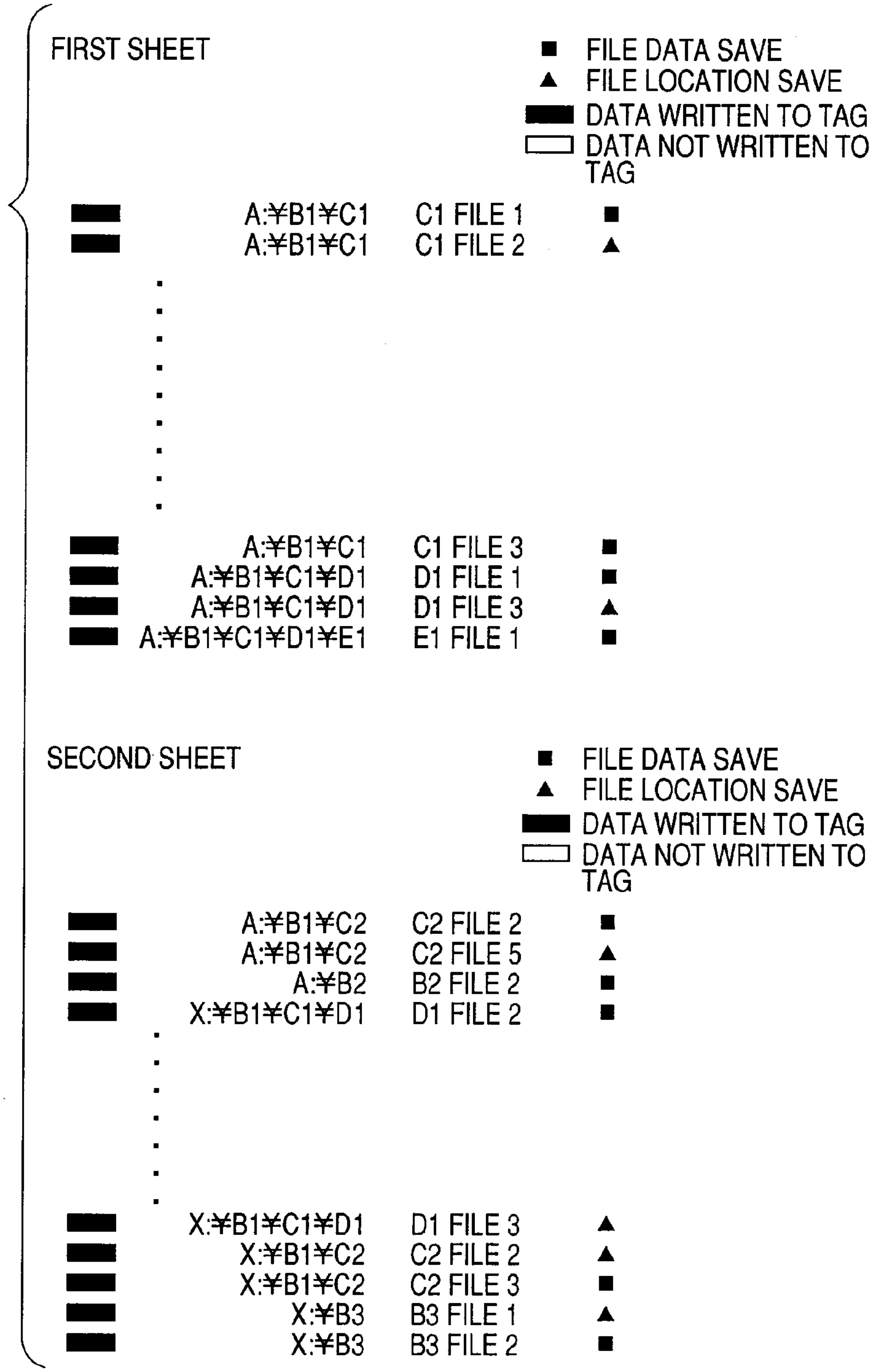
FIG. 10 is an explanatory view showing another form of the print image.

Through the processes, the print data corresponding to an image as shown in FIG. 8 or FIG. 9, and the file data, filename, location information and the like corresponding to each page are sent to the printer 1. If the image of a file cannot be printed on one sheet 3 (S15: Y), then, for example, as shown in FIG. 10, images of a plurality of pages are generated as print data □S10□, which are sent to the printer 1 with the tag writing data respectively corresponding to each page □S11, S16, and S13).

[Process in the Control System (Process in the Printer 1)]

Figure 11:
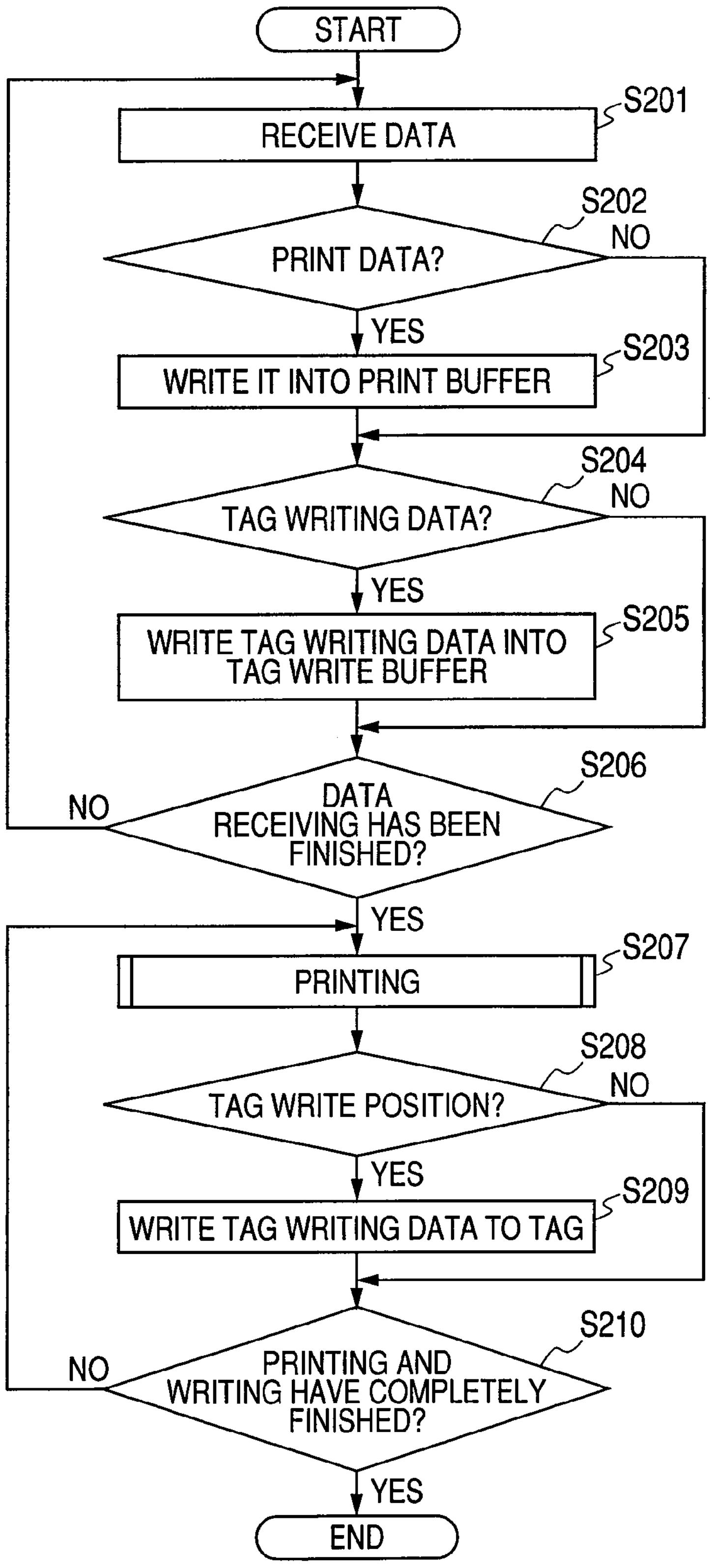
FIG. 11 is a flowchart showing a printer printing process to be executed in the printer.

Next, FIG. 11 is a flowchart showing a printer printing process executed by the controller 200 of the printer 1 in response to the processing of S13 described above. This process is started when the PC 800 sends data to the printer 1.

As shown in FIG. 11, when the process is started, the data sent from the PC 800 is received in S201. In S202, it is determined whether the received data is print data. If the received data is print data (S202: Y), then in S203, the print data is written onto a print buffer defined in the RAM 203. If the received data is not print data (S202: N), the process proceeds to S204.

In S204, it is determined whether the received data is tag writing data. If the received data is tag writing data (S204: Y), then in S205, the tag writing data is written onto a tag write buffer defined in the RAM 203. On the other hand, if the received data is not tag writing data (S204: N), the process proceeds to S206. Note that in S205, the print data is also written as tag writing data onto the tag write buffer. In S206, it is determined whether the data from the PC 800 has completely been received. If the data has not completely been received (S206: N), the process proceeds to S201, so that the processes of S201 to S205 described above will be repeated.

On the other hand, if the data has completely been received from the PC 800 (S206: Y), the process proceeds to S207, where printing on the sheet 3 is started by driving the scanner unit 17, the process unit 18 and the like in accordance with the print data. In S208, it is determined whether the sheet 3 has been transported to the tag write position at which the tag writer 38 can write data onto the tag 3A. If the sheet 3 is not at the tag write position (S208: N), the process proceeds to S210. If the sheet 3 is at the tag write position (S208: Y), then in S209, the tag writing data is written onto the tag 3A, and thereafter, the process proceeds to S210.

In S210, it is determined whether printing of data on the sheet 3 and writing of data on the tag 3A have been finished. If not completed yet (S210: N), the process proceeds to S207, so that the processes of S207 to S209 described above will be repeated. If printing onto the sheet 3 and writing onto the tag 3A are finished (S210: Y), then the process is once ended. Through the foregoing processes, the file image as described above is printed on the sheet 3 and the corresponding tag writing data is written onto the tag 3A.

Furthermore, the controller 200 executes the following tag data reading process when the controller 200 has received from the PC 800 an instruction for reading data on the tag 3A or when the tag reading button 220A of the operation panel 220 is pressed.

Figure 12:
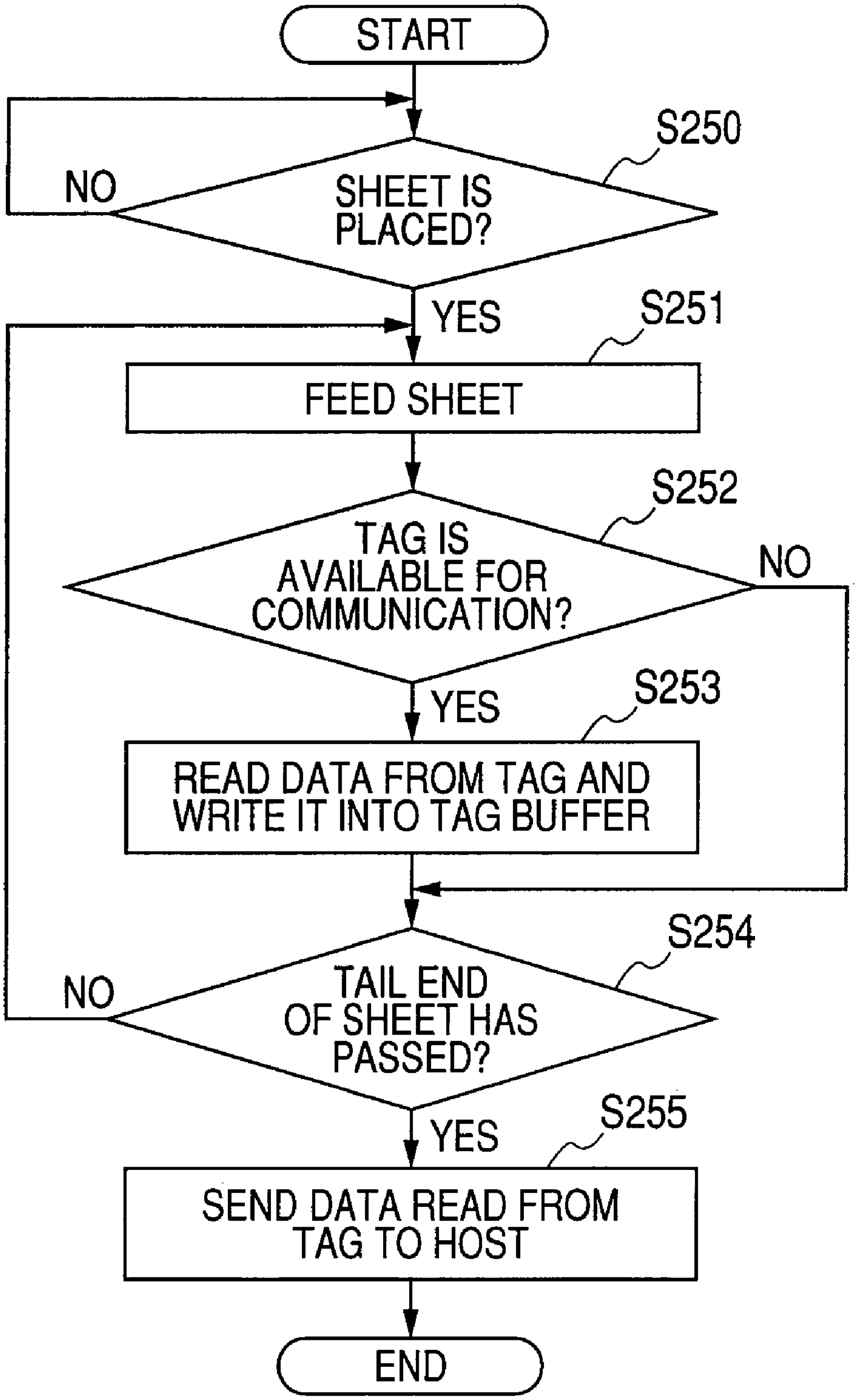
FIG. 12 is a flowchart showing a tag data reading process to be executed in the printer.

FIG. 12 is a flowchart showing the tag data reading process. As shown in FIG. 12, when the process is started, it is first determined in S250 whether the sheet 3 is placed in the multi-purpose tray 14. If the sheet 3 is not placed (S250: N), the process waits as it is in S250. If the sheet 3 is placed (S250: Y), then in S251, the sheet 3 is started to be transported.

In S252 that follows, it is determined whether the tag reader 16 can communicate with the tag 3A. If they cannot communicate with each other (S252: N), the process proceeds to S254. If they can communicate with each other (S252: Y), then in S253, data is read from the tag 3A via the tag reader 16 and written onto the tag buffer in the RAM 203, and then the process proceeds to S254. In S254, it is determined whether the tail end of the sheet 3 has passed and the sheet 3 is ejected onto the sheet discharging tray 36. If the tail end of the sheet has not passed (S254: N), the process proceeds to S251 described above, where the processes of S251 to S253 will be repeated. If the tail end of the sheet has passed (S254: Y), the process proceeds to S255 that follows. In S255, the data read from the tag 3A in S253 is sent to the host (in this case, the PC 800), and the process ends.

Note that when data is read from the tag 3A attached to the sheet 3 held in the multi-purpose tray 14, it is not always necessary to read the data while the sheet 3 is being fed. For example, the data may be read (read out) from the tag 3A attached to the sheet 3 with the sheet 3 held (placed) in the multi-purpose tray 14.

Figure 19:
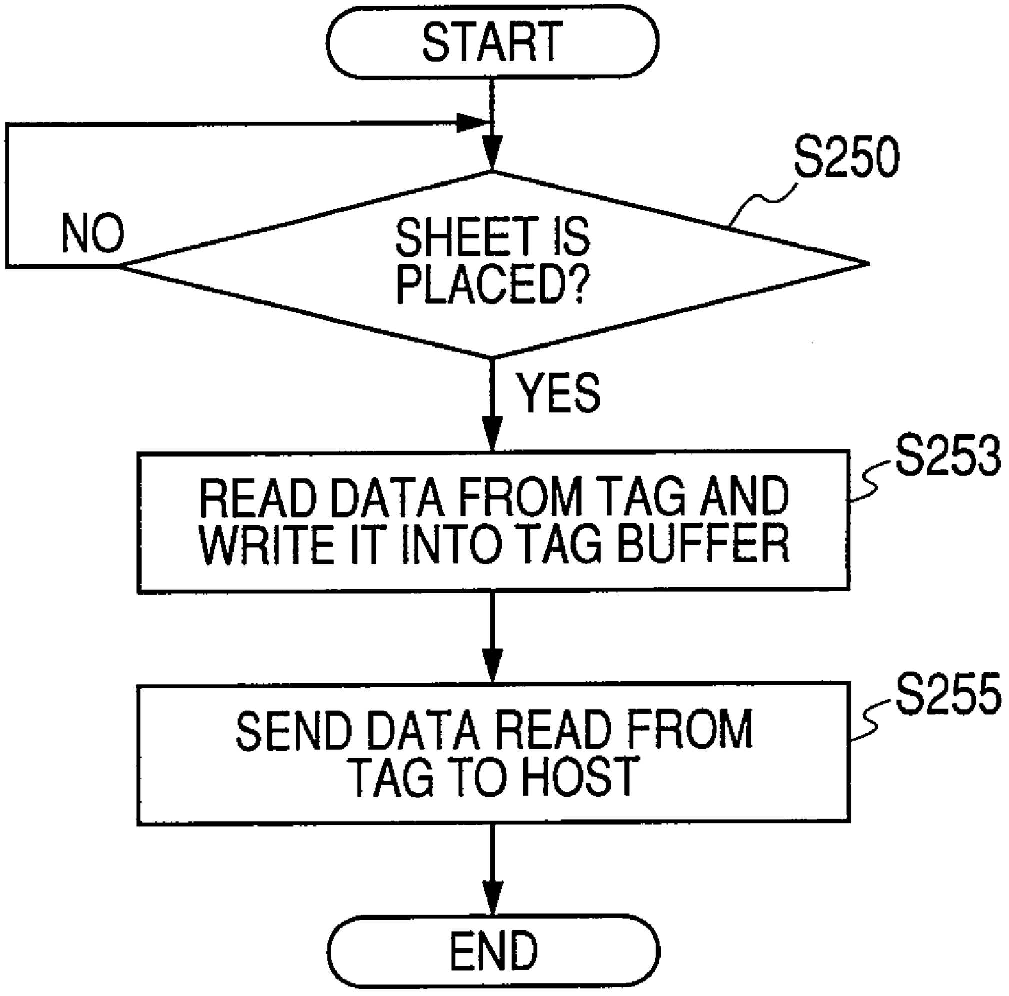
FIG. 19 is a flowchart showing a modified example of the tag data reading process.

FIG. 19 shows the tag data reading process which enables such a reading operation. In the process, each of the processes of S251, S252, and S254 shown in FIG. 12 is omitted.

[Process in the Control System (File Restoration Process in the PC 800)]

Figure 13:
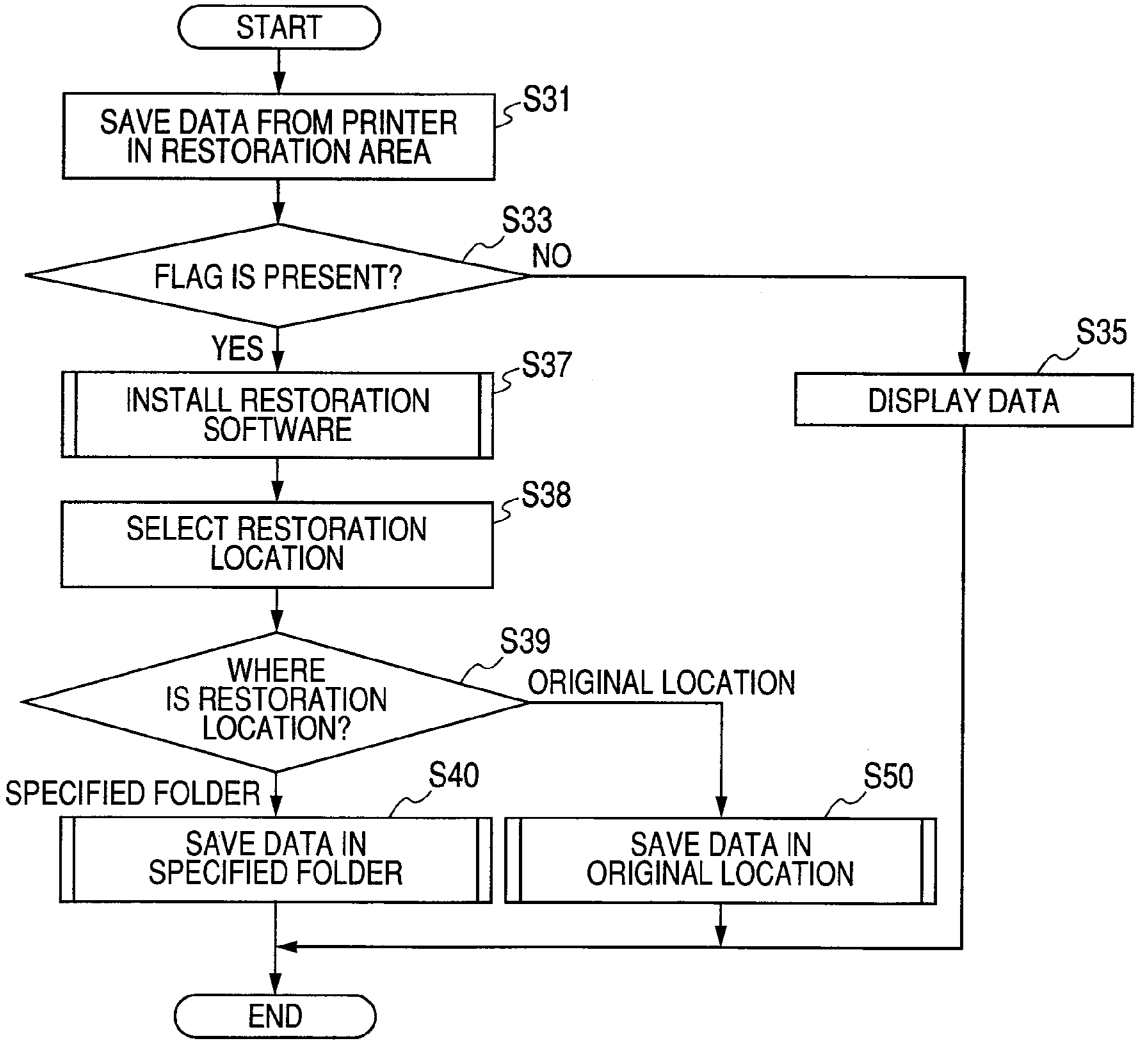
FIG. 13 is a flowchart showing a file restoration process to be executed in the personal computer.

Now, FIG. 13 is a flowchart showing the file restoration process to be executed in the PC 800 on the data sent from the printer 1 through the process of S255 described above. Note that the CPU 811 of the PC 800 executes the process according to a predetermined program stored in the HDD 814 when the data is received from the printer 1.

As shown in FIG. 13, when the process is started, first in S31, the data received from the printer 1 is saved in the restoration area 813C. In S33, it is determined whether a flag indicating that a file is saved for restoration is present in the data. If it is not present (S33: N), then in S35, the data from the printer is displayed in a list on the display 820, and the process ends. Then, the following processes as to whether data described below is subsequently restored or saved are left to the user.

On the other hand, if the flag is present in the data from the printer 1 (S33: Y), then in S37, the restoration software is installed. In S38, a message is displayed on the display 820 to execute a restoration location selecting process for allowing the user to select the restoration location of files. In S39, it is determined that whether a specified folder has been selected or an original location has been selected in the restoration location selecting process. Note that the specified folder may be selected on the tree folder structure displayed on the display 820 or by directly inputting the location information on the keyboard 830. Then, if the specified folder is selected as the restoration location (S39: Specified folder), then in S40, the data is saved in the specified folder. On the other hand, if the original location is selected as the restoration location (S39: Original location), then in S50, the data is saved at the original location. Then, the process ends.

Note that when the restoration program is not stored in the tag 3A, the restoration software may not be installed. In this case, the process of S37 in the file restoration process may be omitted.

Note that it may be determined whether the restoration software is present in the data from the printer 1 in S33 instead of determining whether the flag is present in the data from the printer 1. And when the restoration software is present in the data, the software program is installed in S37.

That is, the restoration may be performed when either one of the flag and the restoration program would be stored in the tag 3A.

Figure 14:
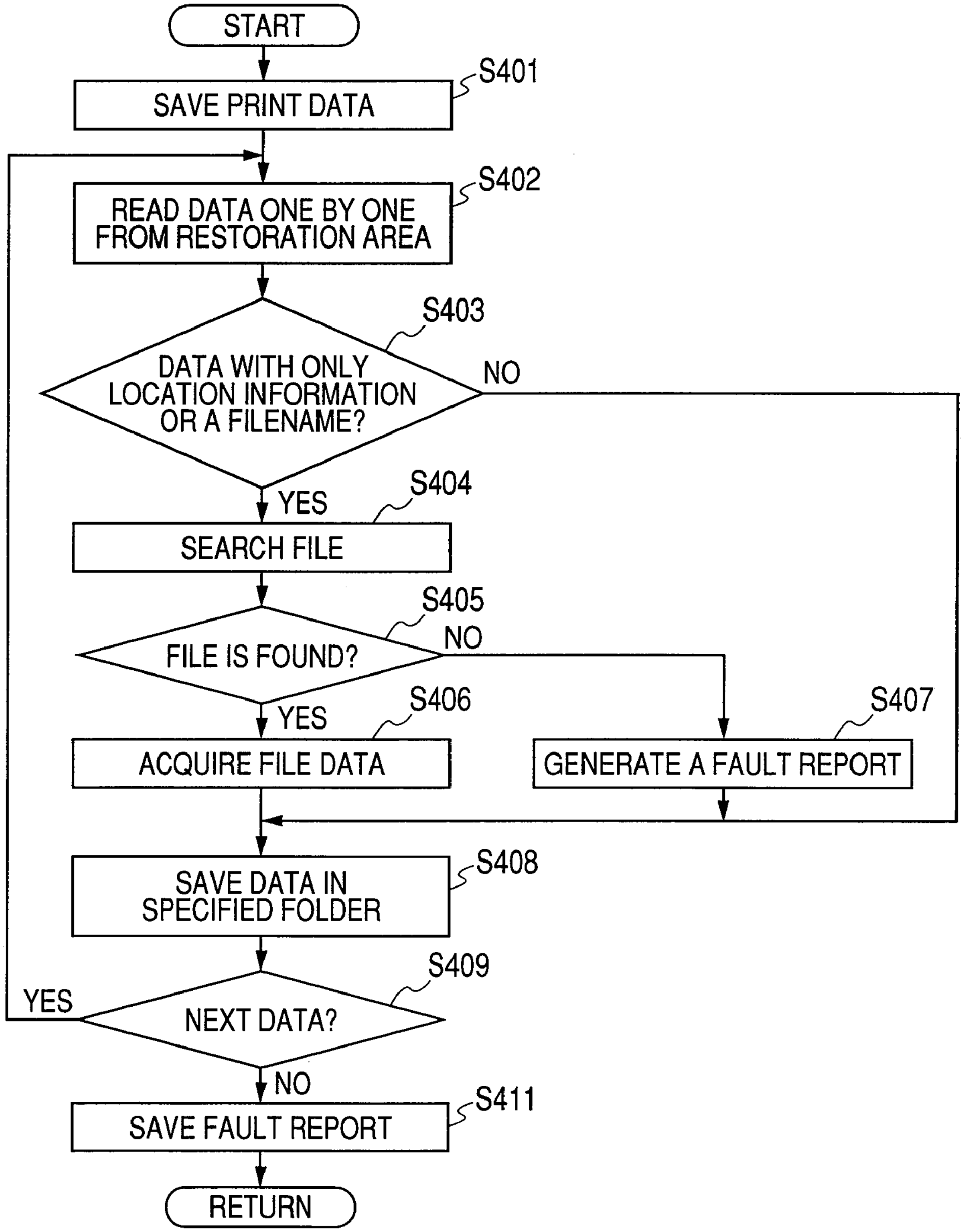
FIG. 14 is a flowchart showing a step of saving into a specified folder in the file restoration process in detail.

FIG. 14 is a flowchart showing in detail the process of S40 for saving data in the specified folder. As shown in FIG. 14, first in S401, the above-described print data saved in the restoration area 813C is saved in the specified folder. In S402, one data is read from the restoration area 813C, and it is then determined in S403 whether the data includes only a filename or location information containing a filename.

If the data contains only location information or a filename (S403: Y), the data is restored into the original file data as follows. That is, in this case, first in S404, the file corresponding to the location information or filename is searched. This search is carried out by the process in the PC 800 when the location information indicates a predetermined area in the PC 800; however, the search may also be conducted according to a URL via a network 700.

In S405 that follows, it is determined whether the file is found. If the file is found (S405: Y), then in S406, the data of the file is acquired. If the file is not found (S405: N), then in S407, a fault report is generated as failure information indicating that the file data could not be acquired. After that, the process proceeds to S408.

In S408, the data having been acquired is saved in the specified folder. For example, if the file data has been acquired (S406), then the file data and the location information or filename read in S402 are saved in the specified folder. On the other hand, if the file has not been found (S405: N), then nothing may be saved or an empty file may be saved. Alternatively, only the location information or the filename having been read in S402 may be saved in the form of a file.

Furthermore, if it is determined in S403 that the data does contain not only location information or a filename (S403: N), the data is the file itself or a flag, which does not require to search for a file to be restored. Thus, in this case, the process directly proceeds from S403 to S408, where the data having been read in S402 is saved in the specified folder.

In S409, it is determined whether the next saved data is still present in the restoration area 813C. If the next data is present (S409: Y), then the process proceeds to S402 described above, so that the processes of S402 to S408 are executed on the next data. If the processes of S402 to S408 described above are completely performed on all data in the restoration area 813C (S409: N), then in S411, the fault report is saved (only when the fault report is present), and then the process ends.

Figure 15:
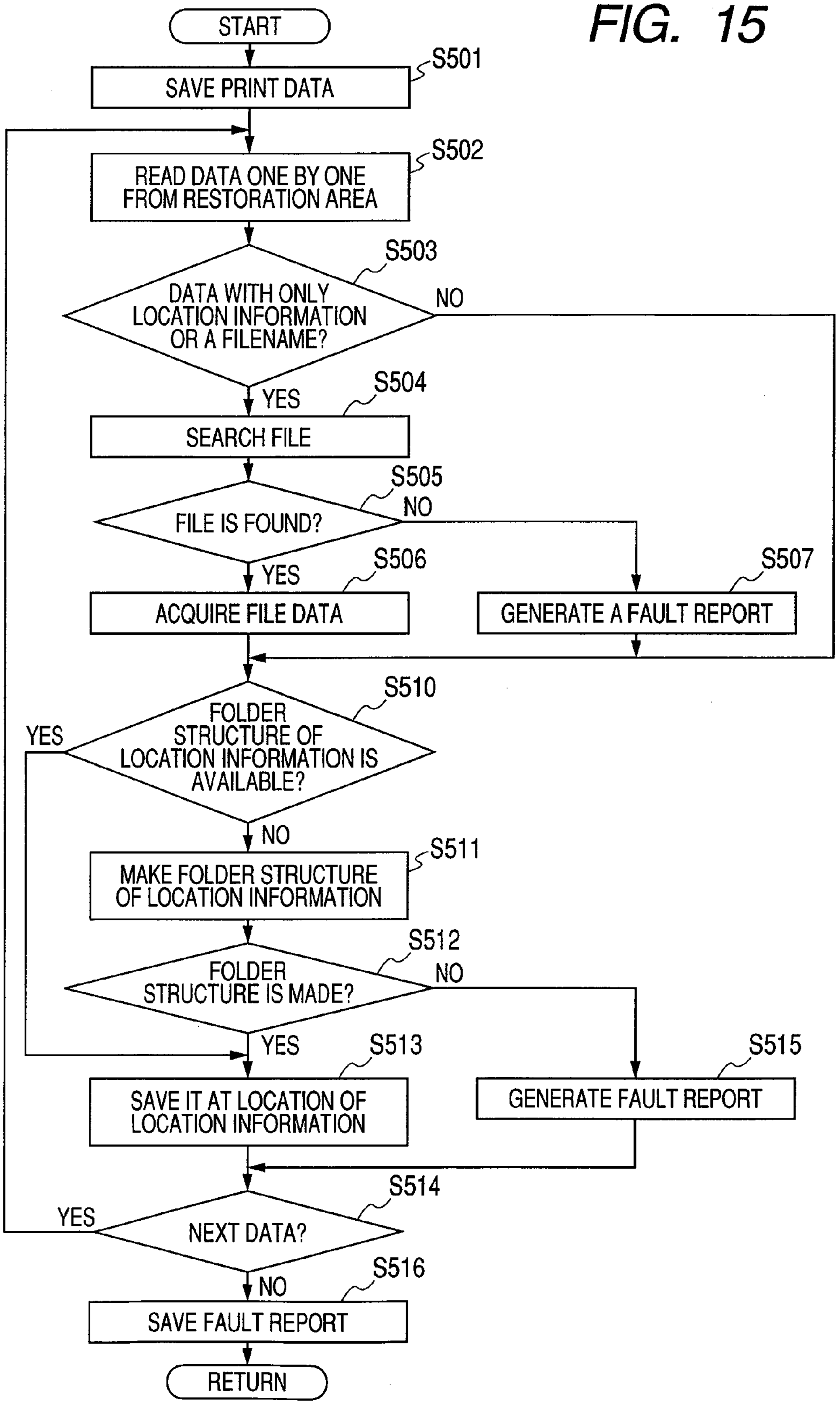
FIG. 15 is a flowchart showing a step of saving into an original location in the file restoration process in detail.

Now, FIG. 15 is a flowchart showing in detail the process of S50 for saving data into an original location. As shown in FIG. 15, in this step, the same processes as those of S401 to S407 described above are first executed in S501 to S507. That is, print data is saved (S501) and one data is read from the restoration area 813C (S502). However, in this step, a folder for saving data is not specified. Thus, in S501, print data is saved in a pre-specified folder of the HDD 814 (e.g., in My Pictures of Microsoft Windows (trade mark)) or saved in a location specified on the PC 800.

If the data read in S502 contains only location information or a filename (S503: Y), the corresponding file is acquired (S504 to S506). When the file cannot be acquired, a fault report is generated (S507), and then the process proceeds to S510. On the other hand, if the data read from the restoration area 813C does not contain only location information or a filename (S503: N), then it is not necessary to search for a file to be restored, and thus the process proceeds directly from S503 to S510.

In S510, it is determined whether or not a folder structure defined by the location information is present in the PC 800. If no such folder structure is present (S510: N), then in S511, the folder structure is made based on the location information. In this step, in some cases, for example, it is made from Root A shown in FIG. 5. In S512, it is determined whether the folder structure has been made. If it has been made (S512: Y), then in S513, the data and the restored file data is saved at the location of the location information. On the other hand, the folder structure is present from the beginning (S510: Y), the process directly proceeds from S510 to S513, where without making a folder structure, the data is saved at the location of the location information in the existing folder structure (S513).

In S514, as in S409 described above, it is determined whether the next data is present. If the next data is present (S514: Y), the process proceeds to S502 described above. On the other hand, if it is determined that a folder structure could not be made in S512 (S512: N), then in S515, the process generates a fault report as failure information indicating that a folder structure could not be made, and then the process proceeds to S514 described above. If the processes of S502 to S515 described above have completely been performed on all data in the restoration area 813C (S514: N), then in S516, the fault report is saved (only when the fault report is present), and then the process ends.

Effects of the Embodiment

As described above, in this embodiment, the data recorded on the tag 3A can be readily restored as a file with only location information or a filename, and then saved in a desired specified folder or at the original location. In addition, when the data of the tag 3A is attached with the flag, this process can be automatically executed. Note that saving data in the specified folder (S40) will provide easy access to the restored file, while saving data at the original location (S50) will provide further improved convenience when the data is used in other applications or the like. In addition, in the latter case, even when a folder structure itself corresponding to the original location has been lost, the folder structure is regenerated to save the data (S511), thereby convenience is further improved.

Furthermore, in this embodiment, since a fault report is generated when the process has failed to restore a file or make a folder structure, the user can quickly take countermeasures. In addition, since the print data of an image printed on the sheet 3 is also saved (S401 and S502), the image can be easily printed on another sheet 3.

Note that in the embodiment, the processes of S404 to S406 and S504 to S506 correspond to the restoration unit; the process of S408 corresponds to the first saving unit; the processes of S511 to S513 correspond to the second saving unit; the processes of S407, S507, and S515 correspond to the failure information generation unit; the processes of S401 and S502 correspond to the image data saving unit; the process of S1 corresponds to the data specifying unit; and the process of S2 corresponds to the recording control unit, respectively.

Modified Examples of this Embodiment

The present invention is not limited to the above-described embodiment but may also be implemented in various forms without deviating from the scope and spirit of the present invention. For example, the present invention is also applicable to such a system that has no printing function and only reads and writes data on a tag 3A. In this case, the tag 3A may not be attached to the sheet 3.

Figure 16:
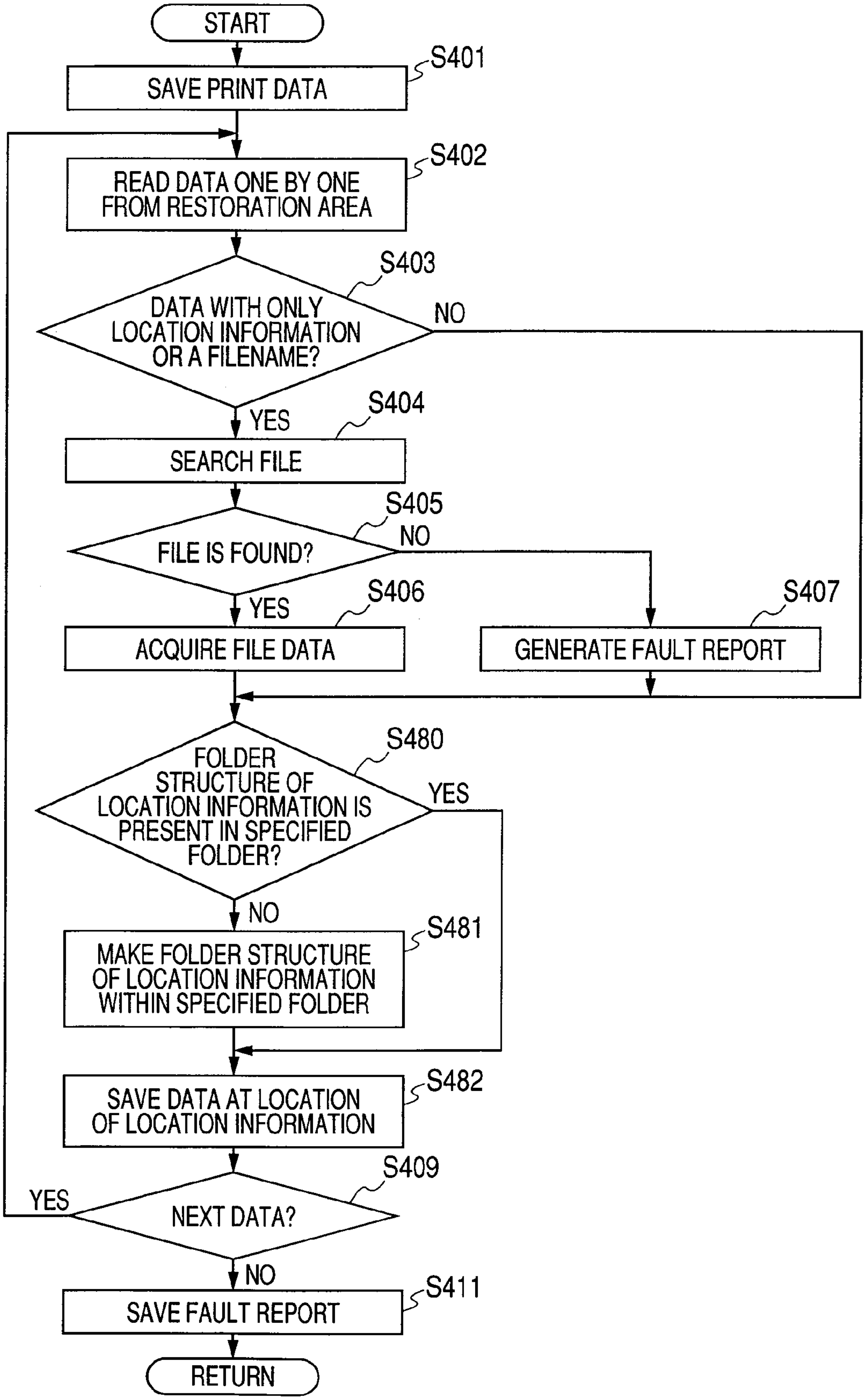
FIG. 16 is a flowchart showing a modified example of a step of saving into the specified folder.

Furthermore, in the process of saving data in the specified folder, the process of S408 may also be changed as follows. FIG. 16 is a flowchart showing such a modified example. Note that this process is the same as that of FIG. 14 except that the process of S408 described above is changed into those of S480 to S482. Thus, description will be made for only those changes.

Figure 17:
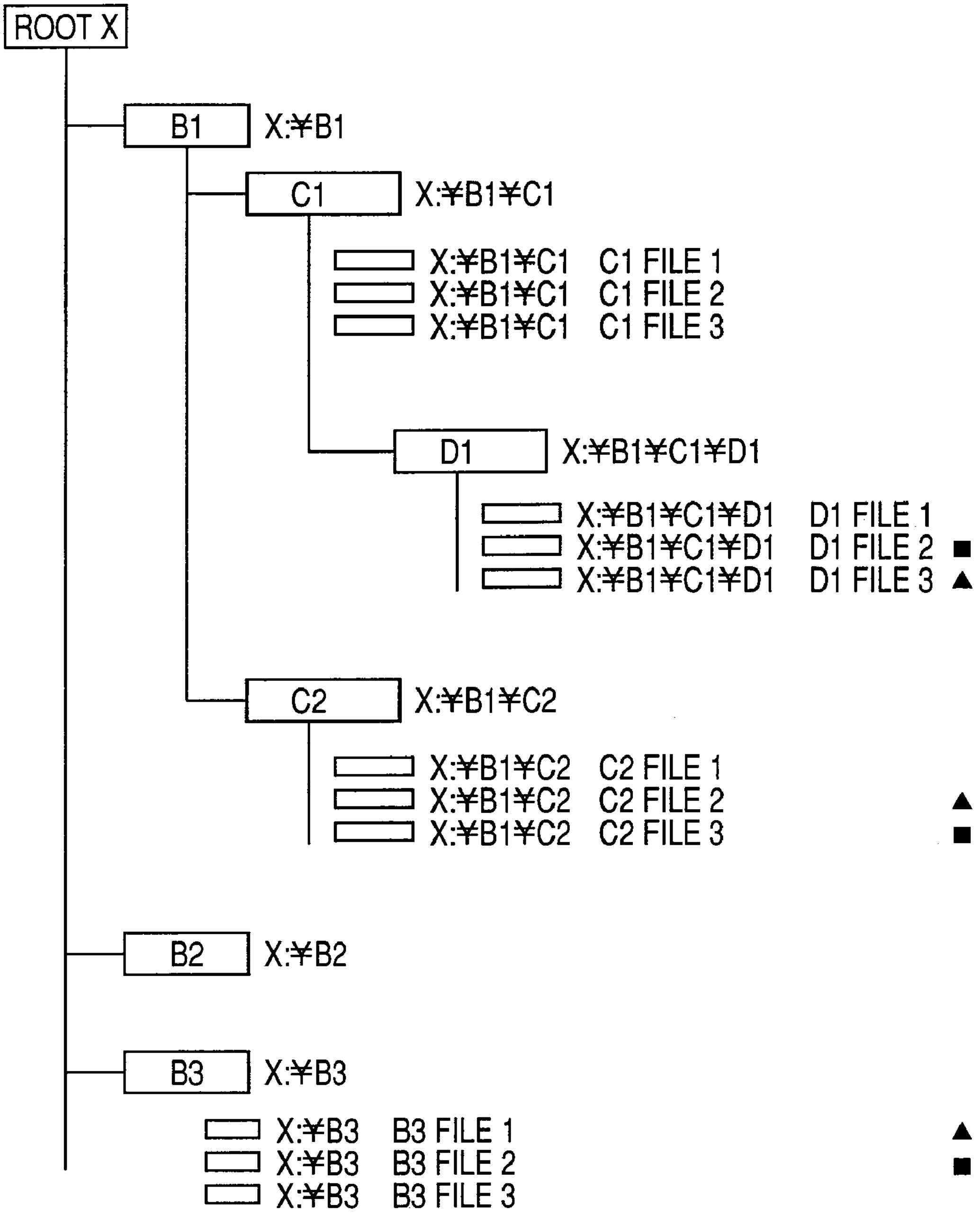
FIG. 17 is an explanatory view showing an example of a folder structure made by the process.

That is, after file data is acquired (S406) and other processes have been performed, the process proceeds to S480, where it is determined whether a folder structure defined by the location information is present in the specified folder. If the folder structure is not present (S480: N), then in S481, the folder structure is made based on the location information. In this case, the folder structure may also be made from Root, in the case of which for example, the name of Root is changed as appropriate as shown in FIG. 17. In S482 that follows, the restored file data or the like are saved at the location indicated by the location information in the made folder structure, and then the process proceeds to S409 described above. On the other hand, if the folder structure is present from the beginning (S480: Y), the process proceeds directly from S480 to S482, where the data is saved at the location, which is indicated by the location information, in the existing folder structure within the specified folder (S482). In this example, without affecting the original folder structure, the restored file data can be saved in the specified folder with the folder structure corresponding to the previous storage location.

Figure 18:
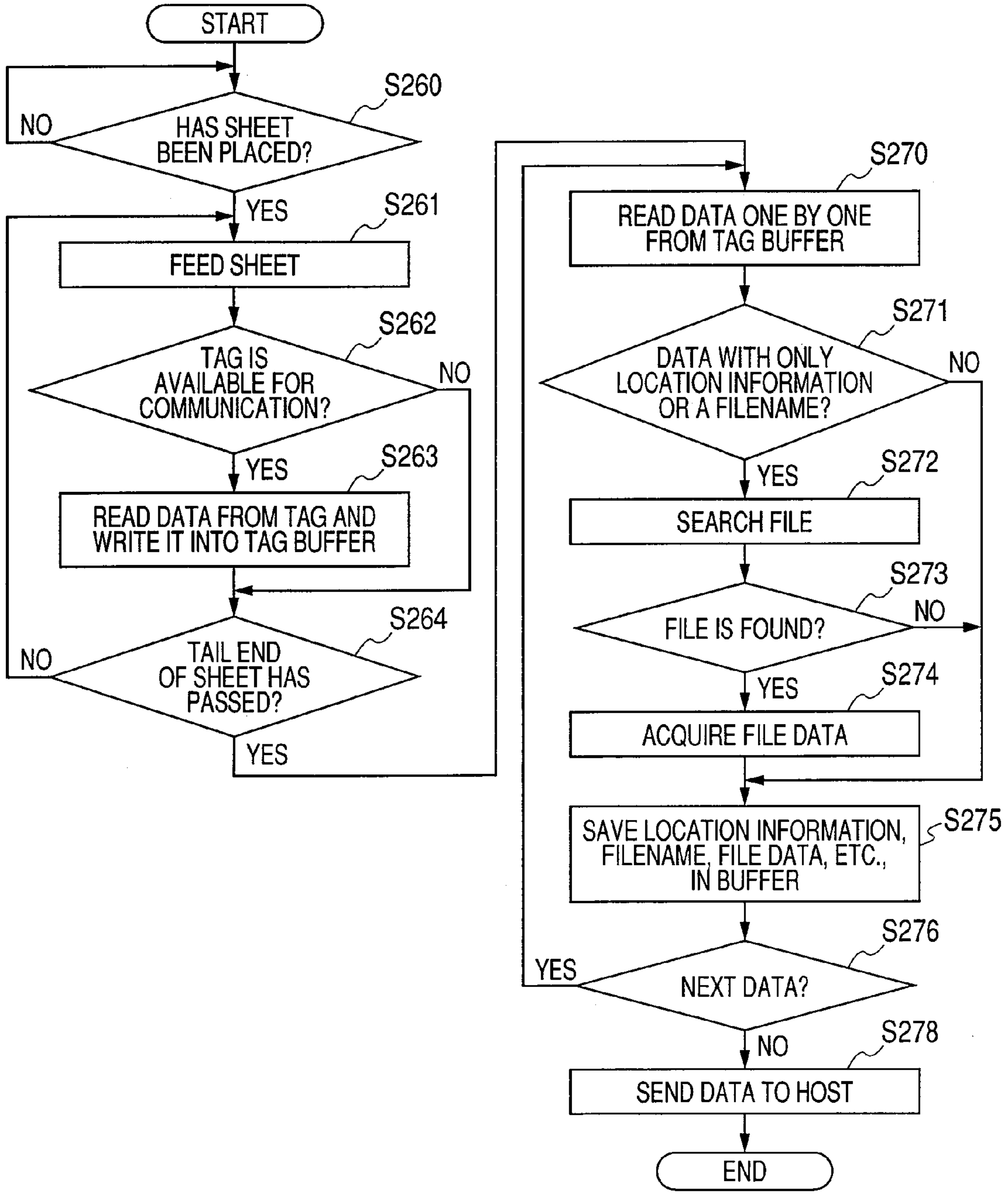
FIG. 18 is a flowchart showing a modified example of the printer printing process.

Furthermore, file data may be restored in the printer 1. FIG. 18 is a flowchart showing a printer printing process according to an embodiment. As shown in FIG. 18, in this process, first in S260 to S264, as in S250 to S254 described above, data is read from the tag 3A to be written onto a tag buffer, and then the process proceeds to S270. In S270, one data is read from the tag buffer. In S271, it is determined whether the data includes only a filename or location information containing a filename.

If the data contains only location information or a filename (S271: Y), then in S272, the file corresponding to the location information or filename is searched. This search is carried out, for example, according to a URL or the like via the network 700 when the network 700 is connected with a plurality of PCs 800 or servers.

In S273 that follows, it is determined whether the file is found. If the file is found (S273: Y), then in S274, the data of the file is acquired, and the process proceeds to S275. If the file is not found (S273: N), then the process proceeds to S275.

In S275, the data having been acquired at that time is saved in a transmission buffer. For example, if file data has been acquired (S274), then the file data and the location information or filename read in S270 are saved in the transmission buffer. On the other hand, if the file has not been found (S273: N), only the location information or the filename having been read in S270 are saved in the transmission buffer.

Furthermore, if it is determined in S271 that the data does not contain only location information or a filename (S271: N), the data is the file itself or a flag, which does not require to search for a file to be restored. Thus, in this case, the process directly proceeds from S271 to S275, where the data having been read in S270 is saved in the transmission buffer.

In S276 that follows S275, it is determined whether the saved next data is still present in the tag buffer. If the next data is present (S276: Y), then the process proceeds to S270 described above, so that the processes of S270 to S275 are executed on the next data. If the processes of S270 to S275 described above are completely performed on all data in the tag buffer (S276: N), then the data in the transmission buffer is sent to the host (in this case, the PC 800) in S278, and then the process ends. In this case, the load on the PC 800 can be alleviated, thereby prevented is adverse effects on other processes in the PC 800.

Note that in the printer printing process shown in FIG. 18, as with the case of FIG. 12, it is not always necessary to read data from the tag 3A attached to the sheet 3 while the sheet 3 held in the multi-purpose tray 14 is fed. For example, as in the tag data reading process shown in FIG. 19, the data may be read with the tag reader 16 from the tag 3A attached to the sheet 3 with the sheet 3 held (placed) in the multi-purpose tray 14.

Furthermore, the tag 3A attached to the sheet 3 may be held over a tag reader, which is provided on the upper surface of the main body case 2 of the printer 1, thereby the data is read (read out) from the tag 3A. In order to successively read the data of the tag 3A on a plurality of sheets 3, the sheets 3 may be held one by one over the tag reader for the reading operation. Alternatively, a so-called anti-collision function may be used to sequentially read data from the tag 3A with a plurality of sheets 3 tied in a bundle.

Furthermore, for example, in the case of a multi function device including a scanner (original document read) function, a copy function, a facsimile function in addition to the printer function, the data recorded in the tag 3A may be read with a tag reader which is disposed along the feed path while the sheet 3 attached with the tag 3A is being fed with an automatic document feeding mechanism (so-called ADF mechanism) included in the scanner function.

Furthermore, as the non-contact tag of the present invention, it is also possible to employ a tag which utilizes infrared light to transmit and received at a. On the other hand, when the printer 1 includes the operation panel 220 of a moderate size and a folder structure in the internal storage area, all the processes that are executed by the PC 800 in the embodiment may be executed in the controller 200. In this case, the printer 1 as a single unit can constitute the data processing apparatus of the present invention.

Furthermore, the embodiment implements restorations using a flag or restoration program; however, the restoration can also be performed anyway without using a flag or restoration program.

The present invention provides illustrative, non-limiting embodiments as follows:

A data processing apparatus includes: a data reading unit that reads data from a non-contact tag; and a restoration unit that restores a file when the data reading unit reads, from the non-contact tag, location information indicating a storage location where the file is previously stored and a flag indicating that the file is to be restored or a restoration program for restoring the file, in accordance with the read at least one of the flag and the restoration program.

According to the above configuration, the data reading unit reads data from the non-contact tag. Then, when the data reading unit reads, from the non-contact tag, location information indicating a storage location of a file and a flag or a restoration program for restoring the file, the restoration unit restores the file in accordance with the flag or the restoration program.

According to the above configuration, when the location information indicating the storage location of the file and the flag or the restoration program for restoring the file are recorded on a non-contact tag attached to a recording medium, it may be possible to readily restore the file. Note that the data of the file itself may or may not be recorded on the non-contact tag of the recording medium.

The data processing apparatus may include a first saving unit that saves the file restored by the restoration unit in a specified storage location. In this case, the first saving unit may enable the data restored by the restoration unit to be saved at the pre-specified storage location. Consequently, this facilitates access to the restored data.

The first saving unit may make a folder structure defined by the location information in the specified storage location and saves the file restored by the restoration unit in the storage location indicated by the location information in the specified storage location. In this case, the restored data is saved at the specified storage location together with the folder structure corresponding to the previous storage location. This can be done without affecting an original folder structure.

The data processing apparatus may further include a second saving unit that saves the file restored by the restoration unit at the storage location indicated by the location information. In this case, the restored data can be saved at the previous storage location, thereby convenience is further improved when the data is used by other applications or the like.

When the storage location indicated by the location information is not present, the second saving unit may make a folder structure defined by the location information and saves the file restored by the restoration unit in the storage location indicated by the location information. In this case, even when a folder structure itself corresponding to the previous storage location has been lost, the entire folder structure can be restored, thereby convenience is further improved.

The data processing apparatus may include a terminal including the data reading unit, and a host including the first or second saving unit. In this case, the restoration unit may be provided in the terminal or in the host. In the former case, data can be more positively restored, while in the latter case, it can be inhibited to have an adverse effect on other processing in the host.

The data processing apparatus may further include a failure information generation unit that generates failure information indicating that the restoration unit fails in restoration processing or the first or second saving unit fails in storage processing. In this case, based on the failure information generated by the failure information generation unit, the user can find out that the restoration unit has failed in restoration processing or the first or second saving unit has failed in storage processing. This makes it possible to take countermeasures quickly.

The restoration unit may access a storage location indicated by the location information, thereby the data is restored. In this case, it is possible to restore similar data very quickly in a simple process when the data is present at the previous storage location.

When the data read by the data reading unit includes a flag indicating that the file is to be restored, the restoration unit may automatically execute the restoration, where as if the flag is not included, it displays the data read by the data reading unit to wait until the user provides an instruction. In this case, based on whether or not the data of the non-contact tag includes the flag, it is possible to allow the restoration to be executed automatically or decided by the user.

When the data read from the non-contact tag by the data reading unit includes the flag indicating that the file is to be restored and the restoration program for restoring the file, the restoration unit may automatically installs the restoration program and restores the file with using the restoration program. In this case, a newly installed restoration program is used to execute the restoration, thereby data can be restored further reliably.

The data processing apparatus may further include an image data saving unit that, when the data read by the data reading unit includes either one of image data and original data of the image data corresponding to an image formed on a surface of a recording medium equipped with the non-contact tag, saves the either one of the image data and the original data. In this case, based on the data saved by the image data saving unit, the image formed on the surface of the recording medium attached with the non-contact tag can be formed again on another recording medium.

The non-contact tag may be attached to a recording medium on which an image based on contents of the data stored in the non-contact tag.

A data processing apparatus include: a data recording unit that records data on a non-contact tag attached to a recording medium including a surface on which an image is capable to be formed; a data specifying unit that specifies a file to be recorded by the data recording unit on the non-contact tag, and a recording control unit that controls the data recording unit to selectively record either one of: (i) at least data of the specified file and location information indicating a storage location where the specified file is stored; (ii) at least a file name of the specified file and the location information; (iii) at least the data of the specified file, the location information, and at least one of a flag that indicates that the specified file is to be restored and a restoration program for restoring the specified file; and (iv) at least the file name of the specified file, the location information and at least one of the flag and the restoration program.

According to the above configuration, specifying data by the data specifying unit would allow the data recording unit to record the data on a non-contact tag attached to a recording medium capable of having an image formed on a surface thereof. In addition, at this time, the recording control unit selectively allows the data recording unit to record either one of (i) at least data of the specified file and location information indicating a storage location where the specified file is stored; (ii) at least a file name of the specified file and the location information; (iii) at least the data of the specified file, the location information, and at least one of a flag that indicates that the specified file is to be restored and a restoration program for restoring the specified file; and (iv) at least the file name of the specified file, the location information and at least one of the flag and the restoration program. When the (i) or (iii) is selected, the specified file can be directly read from the non-contact tag. On the other hand, when (ii) or (iv) is selected the specified data can be readily restored by the data processing apparatus with the restoration unit, and the capacity of the non-contact tag can also be ensured.

The data processing apparatus may further include: an image forming unit that forms, on the surface of the recording medium, an image based on contents of data to be saved in the non-contact tag.

A data processing apparatus includes: a data reading unit that reads data form a non-contact tag, and a restoration unit that restores a file when the data reading unit reads, from the non-contact tag, location information indicating a storage location where the file is previously stored, based on the read location information.

According to the above configuration, the data reading unit reads data from the non-contact tag. Then, when the data reading unit reads the location information indicating the previous storage location of the file from the non-contact tag, the restoration unit restores the file in accordance with the location information.

Consequently, according to the embodiments it may be possible to readily restore the data when the recording medium has recorded the location information indicating a previous storage location of the data.

A recording medium includes: a non-contact tag storing location information indicating a storage location where a file is previously stored, and at least one of a flag indicating that the file is to be restored and a restoration program for restoring the file; and a surface on which an image indicating a relationship between the storage location and other file and folder is formed.

According to the above configuration, the data processing apparatus with the restoration unit can readily restore data by reading the location information and the flag or restoration program recorded on the non-contact tag. In addition, the relationship between the previous storage location of the data and other data and folder saved on the indication surface of the recording medium is available, thereby clearly shown is the location of the data in the system.

What is claimed is:

1. An image processing apparatus comprising:

a data recording unit configured to record data on a non-contact tag;

a data specifying unit configured to specify a plurality of files for which location information is to be recorded by the data recording unit on the non-contact tag, the location information for each file indicating (i) a storage location where the file was originally stored when the location information was saved to the non-contact tag, and (ii) a file name of the file;

a recording control unit configured to control the data recording unit to record the location information of at least some of the plurality of specified files onto the non-contact tag; and an image forming unit configured to print image data showing the location information for each of the specified files, onto a surface of a recording medium that includes the non-contact tag to which the data recording unit records data.

2. The image processing apparatus according to claim 1, wherein the recording control unit is further configured to selectively record any one of:

(i) the data of each of the specified files;

(ii) the data of each of the specified files and at least one of a flag that indicates that a particular specified file is to be restored and a restoration program for restoring the specified file; and (iii) the location information and at least one of the flag and the restoration program.

3. The image processing apparatus according to claim 1, further comprising:

a data reading unit configured to read data from a non-contact tag, the data comprising at least location information indicating:

(i) a storage location of where a file was originally stored when the data was saved to the non-contact tag ; and (ii) a file name of the file; and a restoration unit configured to restore a file based on the data read from the non-contact tag by finding the file corresponding to the location information and acquiring the data of the file.

4. The image processing apparatus according to claim 3, wherein the restoration unit is configured to restore the file by:

(i) reading the file data from the tag itself if the file data is stored on the tag in addition to the location information; and (ii) finding the file corresponding to the location information and acquiring the data of the file if only the location information is stored on the tag.

5. The image processing apparatus according to claim 3, wherein the restoration unit is further configured to restore the file when the data read from the non-contact tag includes one or both of (i) a flag indicating that the file is to be restored; and (ii) a restoration program for restoring the file.

6. The image processing apparatus according to claim 3, further comprising a processing unit; and memory have executable instructions stored thereon that, when executed by the processing unit, cause the image processing apparatus to provide a saving unit that saves the file restored by the restoration unit in a specified storage location.

7. The image processing apparatus according to claim 6, wherein the saving unit makes a folder structure defined by the location information in the specified storage location and saves the file restored by the restoration unit in the storage location indicated by the location information in the specified storage location.

8. The image processing apparatus according to claim 3, further comprising a processing unit; and memory have executable instructions stored thereon that, when executed by the processing unit, cause the image processing apparatus to provide a saving unit that saves the file restored by the restoration unit at the storage location indicated by the location information.

9. The image processing apparatus according to claim 8, wherein when the storage location indicated by the location information is not present, the saving unit makes a folder structure defined by the location information and saves the file restored by the restoration unit in the storage location indicated by the location information.

10. The image processing apparatus according to claim 6, comprising:

a terminal including the data reading unit; and a host including the saving unit, wherein the terminal further includes the restoration unit.

11. The image processing apparatus according to claim 8, comprising:

a terminal including the data reading unit; and a host including the saving unit, wherein the terminal further includes the restoration unit.

12. The image processing apparatus according to claim 6, comprising:

a terminal including the data reading unit; and a host including the saving unit, wherein the host further includes the restoration unit.

13. The image processing apparatus according to claim 8, comprising:

a terminal including the data reading unit; and a host including the saving unit, wherein the host further includes the restoration unit.

14. The image processing apparatus according to claim 3, further comprising a processing unit; and memory have executable instructions stored thereon that, when executed by the processing unit, cause the image processing apparatus to provide a failure information generation unit that generates failure information indicating that the restoration unit fails in restoration processing.

15. The image processing apparatus according to claim 6, further comprising a processing unit; and memory have executable instructions stored thereon that, when executed by the processing unit, cause the image processing apparatus to provide a failure information generation unit that generates failure information indicating that the restoration unit fails in restoration processing or that the saving unit fails in saving processing.

16. The image processing apparatus according to claim 8, further comprising a processing unit; and memory have executable instructions stored thereon that, when executed by the processing unit, cause the image processing apparatus to provide a failure information generation unit that generates failure information indicating that the restoration unit fails in restoration processing or that the saving unit fails in saving processing.

17. The image processing apparatus according to claim 3, wherein the restoration unit restores the file by accessing the storage location indicated by the location information.

18. The image processing apparatus according to claim 3, wherein when the data read from the non-contact tag by the data reading unit includes the flag indicating that the file is to be restored, the restoration unit automatically restores the file, and wherein when the data read by the data reading unit does not include the flag, the data read by the data reading unit is displayed.

19. The image processing apparatus according to claim 18, wherein when the data read from the non-contact tag by the data reading unit includes the flag indicating that the file is to be restored and the restoration program for restoring the file, the restoration unit automatically installs the restoration program and restores the file with using the restoration program.

20. The image processing apparatus according to claim 3, further comprising:

a processing unit; and memory have executable instructions stored thereon that, when executed by the processing unit, cause the image processing apparatus to provide an image data saving unit that, when the data read by the data reading unit includes either one of image data and original data of the image data corresponding to an image formed on a surface of a recording medium equipped with the non-contact tag, saves the either one of the image data and the original data.

21. A non-transitory recording medium comprising:

a non-contact tag storing location information for a plurality of files, the location information for each file indicating (i) a storage location where the file was originally stored when the location information was saved to the non-contact tag, and (ii) a file name of the file; and a surface on which an image showing the location information for each of the plurality of files is formed.

22. The non-transitory recording medium according to claim 21 wherein the non-contact tag further stores one or both of (i) a flag indicating that the file is to be restored by finding the file and acquiring its data; and (ii) a restoration program that when executed by a processing unit causes the file to be restored.

* * * * *